US 11,872,578 B2

(12) United States Patent
Chevron et al.

(10) Patent No.: US 11,872,578 B2
(45) Date of Patent: Jan. 16, 2024

(54) METHOD AND FACILITY FOR APPLYING A COATING PRODUCT USING A PRINT HEAD

(71) Applicant: EXEL INDUSTRIES, Epernay (FR)

(72) Inventors: Didier Chevron, Paris (FR); Camilien Beaudoin, Paris (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 17/350,453

(22) Filed: Jun. 17, 2021

(65) Prior Publication Data
US 2021/0394217 A1 Dec. 23, 2021

(30) Foreign Application Priority Data
Jun. 17, 2020 (FR) ...................... 2006334

(51) Int. Cl.
B05B 13/04 (2006.01)
B05B 12/16 (2018.01)
B05C 5/02 (2006.01)
B05D 1/02 (2006.01)

(52) U.S. Cl.
CPC .......... B05B 13/0431 (2013.01); B05B 12/16 (2018.02); B05C 5/0275 (2013.01); B05D 1/02 (2013.01)

(58) Field of Classification Search
None
See application file for complete search history.

(56) References Cited

U.S. PATENT DOCUMENTS
2021/0170763 A1* 6/2021 Büstgens ............... B41J 2/2132

FOREIGN PATENT DOCUMENTS
DE 102014011301 A1 12/2014
WO WO-2019201367 A1 * 10/2019 ......... B05B 13/0452

OTHER PUBLICATIONS
INPI Rapport de Recherche Préliminaire for Patent Application No. FR 2006334, dated Feb. 26, 2021, 2 pp.

* cited by examiner

Primary Examiner — Michael P. Rodriguez
(74) Attorney, Agent, or Firm — Soquel Group LLC

(57) ABSTRACT

The invention relates to a method for application of coverage product on a surface using a print head that is mounted on a robot arm, and that is made up of a body equipped with at least one printing nozzle. The method includes a) defining a strip of surface to be coated, b) defining a trajectory for the strip of surface, the trajectory including a succession of reference points, c) removing a strip of surface from an information sheet modelling the surface to be coated, d) restarting at a) until the modelled surface to be coated becomes a null area, e) defining an activation program for each print head nozzle on each trajectory, and f) applying the coverage product by activating each print head nozzle on the different trajectories depending on the orientation of the print head at each reference point, based on the activation program.

17 Claims, 13 Drawing Sheets

METHOD AND FACILITY FOR APPLYING A COATING PRODUCT USING A PRINT HEAD

CROSS-REFERENCE TO RELATED APPLICATION

This application claims priority of French Patent Application No. 20 06334, filed on Jun. 17, 2020.

FIELD OF THE INVENTION

This invention relates to a method for applying a coating to the surface of an object to be coated by means of a print head mounted on a robot arm with at least one print nozzle. The invention also relates to the facility of a coating application intended for the implementation of this method.

BACKGROUND OF THE INVENTION

US-A-2015/0042716 shows how to generate a set of points in space corresponding to an area to be coated, generate a corresponding three-dimensional network, and generate trajectory data for moving a robot mounted with a print head, as well as raster data for activating a print head.

It is also known, from US-A-2016/0052312, how to apply a coating by means of print heads moving along two trajectories that form an acute angle between them, which is particularly suitable for coating a curved surface.

These known methods are workable in theory but are, in practice, difficult to implement when the constraints related to the geometry of the surface to be coated and any surface that is not to be coated, as well as the constraints related to the movement of the print head, must all be taken into account.

SUMMARY OF THE DESCRIPTION

It is these drawbacks in particular that the invention intends to remedy, by proposing a new method of applying a liquid coating to a surface to be coated by means of a print head, this method being easier and more intuitive to use and exhibiting better results than those of the prior art.

To this end, the invention concerns a method of applying a coating to the surface of an object to be coated, using a digital model of this surface contained in a computer file, with at least one area to be coated, this method being implemented by means of a print head mounted on a robot arm designed for moving the print head in relation to the surface, the body of which is equipped with at least one print nozzle. According to the invention, the method of application is performed by a computer and includes:
  a) defining a strip of the surface to be coated via an automatic calculation from the computer file containing the model of the surface to be coated;
  b) defining, via an automatic computation, a trajectory opposite the surface strip to be coated, this trajectory being formed by a succession of remarkable points to be reached by a specific point of the print head, with, at each remarkable point, an orientation of the print head to be respected;
  c) removing, via an automatic computation, the strip to be coated from the computer file modelling the surface to be coated;
  d) repeating a) until the modelled surface to be coated is of zero area;
  e) defining a program for activating each print head nozzle on each trajectory; and
  f) applying the coating by activating each print head nozzle on the different trajectories defined at b) while respecting orientation of the print head at each remarkable point, according to the triggering program defined at e).

With this invention, a computer file modelling the surface to be coated via back-and-forth movements of a print head uses simple elements such as points, segments, or edges on the periphery of the surface to be coated to define a three-dimensional trajectory for the robot that is a function only of that surface. Then, with the method of the invention, a program can be automatically generated to orient the print head correctly and activate the print head nozzles such that the coating is applied to the portions of the surface to be coated.

An initial constraint taken into account by the method of the invention is that the print head tended to remain oriented in a predefined direction, e.g., a direction corresponding to a forward trajectory along a strip of the surface to be coated, using simple elements selected initially like the aforementioned points, segments, and edges.

According to advantageous but not mandatory aspects of the invention, this method may incorporate one or more of the following features, used in any combination that is technically feasible:
  b) includes:
    bA) defining a portion of the surface strip to be coated via an iterative method;
    bB) calculating a point of impact on the portion defined at bA) and an axis on which the print head will be oriented at the point of impact;
    bC) removing, by computation, a fraction of the surface strip to be coated;
    bD) starting over from bA) and repeating until the remaining area of the surface strip to be coated is zero;
    bE) generating a portion of the trajectory corresponding to one forward movement of the print head across the strip to be coated; and
    bF) depending on the width of the band of coating delivered from the print head and that of the strip to be coated, generate the portion of the trajectory (back or forth) corresponding to an additional movement of the print head across the strip to be coated.
  The method includes an additional operation for surfaces to be coated that contain at least one area that is not to be coated. This operation, implemented between b) and c), includes adjusting the print head trajectory based on the area not to be coated so as not to hit the object.
  a) includes:
    a1) defining a first orthogonal system, having
      as origin a point selected by a user, either on an imaginary supporting surface located near the surface to be coated in a representation of space using the computer file, or on the surface to be coated itself,
      as height axis a normal from the point of origin at the supporting surface or on the surface,
      as y-axis the cross product of the height axis and an axis aligned with a direction of movement selected by the user, and
      as x-axis the cross product of the y-axis and the height axis.
    a2) defining a first normal and initiate its value as equal to a vector whose direction is the most recently-defined height axis of the first orthogonal system;

a3) defining point 1 of the first orthogonal system as the point on the surface to be coated with the longest y-axis of the first orthogonal system, among the points on the surface to be coated;

a4) defining point 2 of the first orthogonal system as the point on the surface to be coated located, with respect to the first point, at a first distance, measured going back along the y-axis, this first distance being fixed as a function of the distribution of the nozzles on the print head;

a5) calculating a mean normal to a temporary strip of the surface to be coated, defined between a first plane and a second plane perpendicular to the y-axis of the first orthogonal system and passing respectively through the first and second points a6) comparing the first normal to the mean normal;

a7) if the first normal and the mean normal are identified as different during a6),
  a71) redefining the first normal as equal to the mean normal;
  a72) redefining the first orthogonal system using this new first normal;
  a73) reiterating a3) to a6);

a8) if the first normal and the mean normal are identified as equal at a6), define the strip to be coated as equal to the temporary strip at a5).

The print head body is equipped with several nozzles arranged in parallel rows with first distance being a multiple of a distance between two rows of adjacent nozzles or between two consecutive nozzles in the same row, measured perpendicular to the print head's direction of movement.

b) comprises:
  b1) defining a second orthogonal system having as origin the point 1, and as x and y axes and axis heights coincident with most recently-defined axis of the first orthogonal system, at a1) or at a72);
  b2) defining a new x-axis as the x-axis of the second orthogonal system;
  b3) defining an initial point on the second orthogonal system as the point on the surface strip to be coated having the shortest y-axis among the points on the strip;
  b4) defining a cut-off point on the second orthogonal system as a point on the surface strip to be coated, located along the new x-axis at a given distance from the initial point;
  b5) calculating a mean normal to a temporary portion of the strip of the surface to be coated, defined between a third plane and a fourth plane perpendicular to the new x-axis and passing through the initial point and the cut-off point, respectively;
  b6) calculating a temporary longitudinal axis equal to the normalized cross product of the mean normal calculated at b5) and the opposite of the y-axis of the second orthogonal system;
  b7) comparing the new x-axis to the temporary longitudinal axis;
  b8) if the new x-axis and the temporary longitudinal axis are identified as different at b7), then
    b81) redefining the new x-axis as equal to the temporary longitudinal axis;
    b82) reiterating b3) to b7)
  b9) if the new x-axis and the temporary longitudinal axis are identified as equal at b7), defining a portion of the strip to be coated as equal to the temporary portion at b5).

b) comprises, following b1) to b9):
  b10) calculating an orientation vector for the print head equal to the cross product of the new x-axis and the opposite of the y-axis of the second orthogonal system;
  b11) defining a center point as a point located
    halfway between the orthogonal projections from the initial point and the cut-off point on a line passing through the initial point and a direction vector equal to the new axis, and
    at a third distance from the initial point measured along the y-axis of the second orthogonal system and going back along this axis, the third distance being equal to one-half the first distance;
  b12) defining a point of impact as the projection from the center point on the portion of the surface strip to be coated along a line whose direction vector is the print head orientation vector;
  b13) if a point of impact exists, including the point of impact and the print head orientation vector in the trajectory.

The print head body is equipped with several nozzles arranged in parallel rows, while the coordinate of the center point along the new x-axis of the second orthogonal system is equal to half the sum of the x-coordinates of the orthogonal projections from the initial point and the cut-off point on a straight line passing through the initial point and the direction vector equal to the new axis while the center point is shifted, with respect to this line, in the direction opposite that of the y-axis of the second orthogonal system, by a distance equal to half the product of the number of nozzle rows and the distance between two of these rows as measured along the y-axis.

If the point of impact at b12) does not exist, due to the absence of material from the surface strip to be coated along a line whose direction vector is the print head orientation vector and which passes through the center point, then performing, between b12) and b13):
  b14) find an end-point for the portion of the strip to be coated, whose position along an axis parallel to the print head orientation vector is furthest away, in a direction opposite to this vector;
  b15) project the end-point onto an axis passing through the center point and parallel to the print head orientation vector to define an alternate point of impact; and
  b16) assimilate the point of impact with the alternate point of impact for the portion of strip to be coated in progress.

b) includes, following b1) to b13):
  b18) reducing the surface strip to be coated by a fraction thereof, i.e., by the portion defined at b9);
  b19) determining whether the remaining surface strip to be coated has a non-zero area;
  b20) if the result of the calculation at b19) is affirmative, reiterating b3) to b19).

b) includes, following b1) to b13):
  b21) defining a print head axis vector at each point of impact as equal to the normalized cross product of the print head orientation vector at this point and the y-axis of the second orthogonal system;
  b23) using the point of impact, the distribution of the nozzle(s) on the print head, the print head axis vector, and the y-axis of the second orthogonal system to define a remarkable point to be reached;

b24) including the remarkable point and the print head orientation vector at the corresponding point of impact in the trajectory.

b) includes adding at least one additional entry point and/or exit point, compared to those calculated at b24), to the trajectory defined for each surface strip to be coated, and/or optimizing the number of remarkable points on the trajectory when at least one remarkable point is removed, i.e., a remarkable point that is collinear with a point preceding it and a point following it along the trajectory, and whose orientation axis is parallel to that of the point preceding it and the point following it along the trajectory.

b) includes determining the number of times the print head needs to move back and forth to finish coating the strip to be coated, depending on the width of the band of coating delivered from the print head and that of the strip to be coated. Where needed, after the first forward movement across the strip to be coated, one or more trajectory sections are calculated by reversing the order of the remarkable points defined for the preceding trajectory section at b22).

a71) to a73), or b81) and b82) are implemented until a limited number of iterations is reached.

From the trajectory defined at b), the computer calculates, for each print head nozzle, a distance to be either coated or not coated over a succession of forward steps of the print head.

e) includes:
  e1) discretizing the movement of the print head between the remarkable points on a trajectory by means of discretized positions;
  e2) determining the existence of an impact point for each nozzle in each position discretized at e1);
  e3) calculating a distance to be coated or not coated at each discretized position of the trajectory and, optionally, multiplier coefficients, as a function of the distance between a nozzle and a reference nozzle; and
  e4) building a programming file for the activation of each nozzle along the trajectories.

Viewed from another angle, the invention relates to a facility for applying a liquid coating to the surface of an object to be coated, this facility including a print head mounted on a robot arm designed for moving the print head in relation to the surface, the body of which is equipped with at least one print nozzle. This facility comprises an electronic control unit configured to implement a method such as that described above.

BRIEF DESCRIPTION OF THE DRAWINGS

The invention will be better understood and advantages beyond these will emerge more clearly in light of the following description of the accomplishment of a method using its principle, given solely by way of example and made with reference to the accompanying drawings, in which.

DETAILED DESCRIPTION

Figure 1:
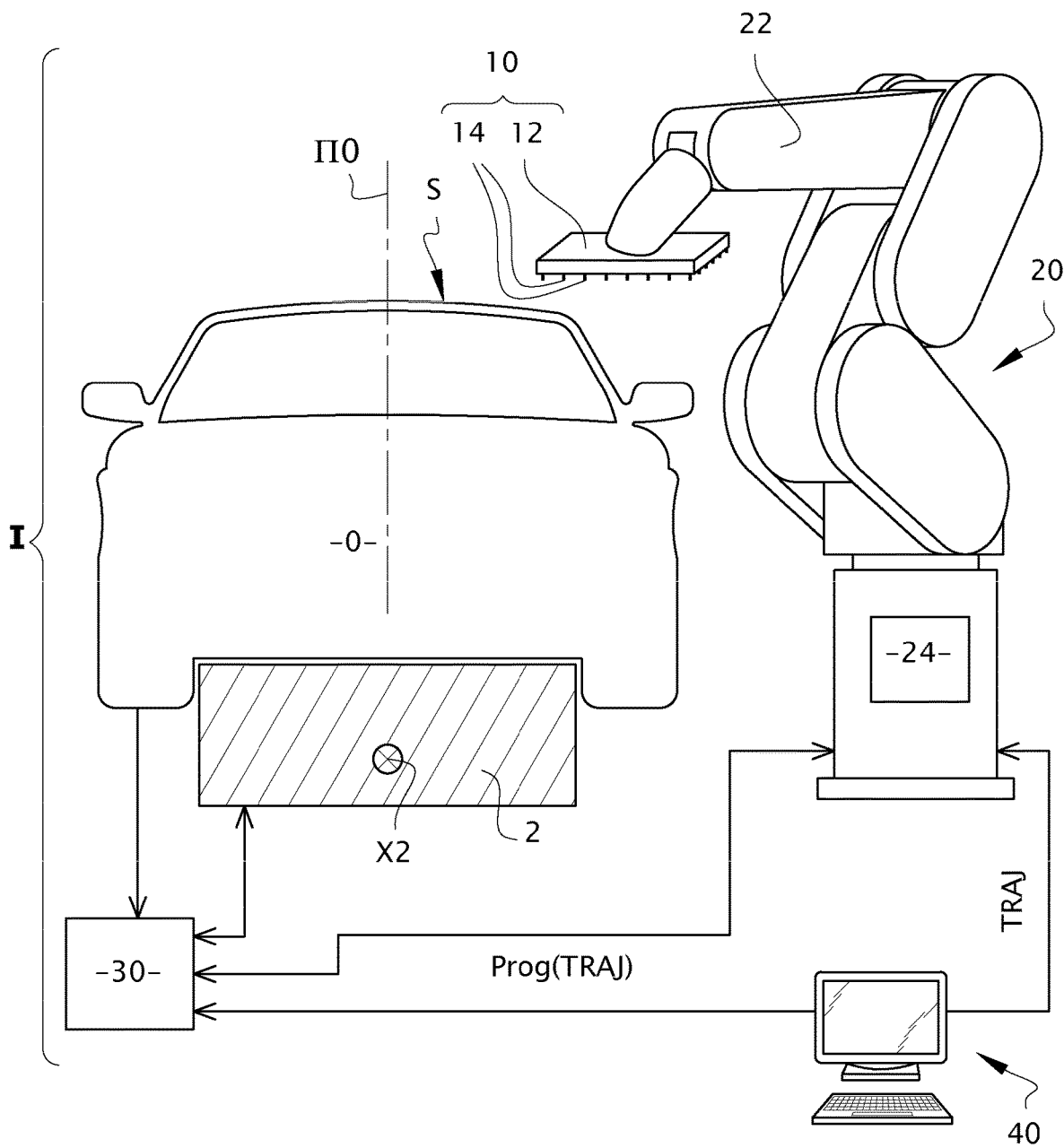
FIG. 1 shows the principle of a facility for coating a motor vehicle body in accordance with the invention, which implements a method also in accordance with the invention.

The facility I shown in FIG. 1 is used for applying paint to objects O which, in the example used for this figure, are motor vehicle bodies.

More precisely, in this example, facility I is designed for coating the roof of the vehicle body on either side of a median plane n0 parallel to the largest dimension of the body.

Alternatively, the objects to be coated may be other parts of a motor vehicle body, such as bumpers or doors or, in general, any object that can be coated, such as, for instance, parts of an aircraft cabin or household appliance panels.

Facility I includes a conveyor 2 designed to move objects O along a conveying axis X2, perpendicular to the plane of FIG. 1. This conveyor is preferably of the "stop-and-go" type, that is to say, it holds the objects stationary while the coating is being applied. Facility I also includes an applicator 10 mounted at the end of an arm 22 of a multi-axis robot 20 placed near conveyor 2. Alternatively, robot 20 may be a reciprocating robot or any other robot capable of moving applicator 10 in relation to the objects O to be coated. Robot 20 includes a controller 24, sometimes referred to as a "robot bay", which controls the movements of arm 22 as a function of a trajectory program TRAJ to be followed.

In FIG. 1, controller 24 is shown inside of robot 20. However, controller 24 may alternatively be placed outside of robot 20.

Applicator 10 is a print head including a rigid body 12 and a number of print nozzles 14.

Facility I also includes an electronic control unit 30, or ECU, which is in bidirectional communication with at least conveyor 2 and controller 24 of robot 20, and which also controls print head 10. To this end, ECU 30 contains at least one micromethodor and memory for storing a computer program (micromethodor and memory not shown). Communication between ECU 30 and controller 24 allows the activation of the print head to be synchronized with the position of robot arm 22.

In FIG. 1, ECU 30 is shown independent of devices 2 and 20. Alternatively, ECU 30 may be integrated into robot 20.

Figure 2:
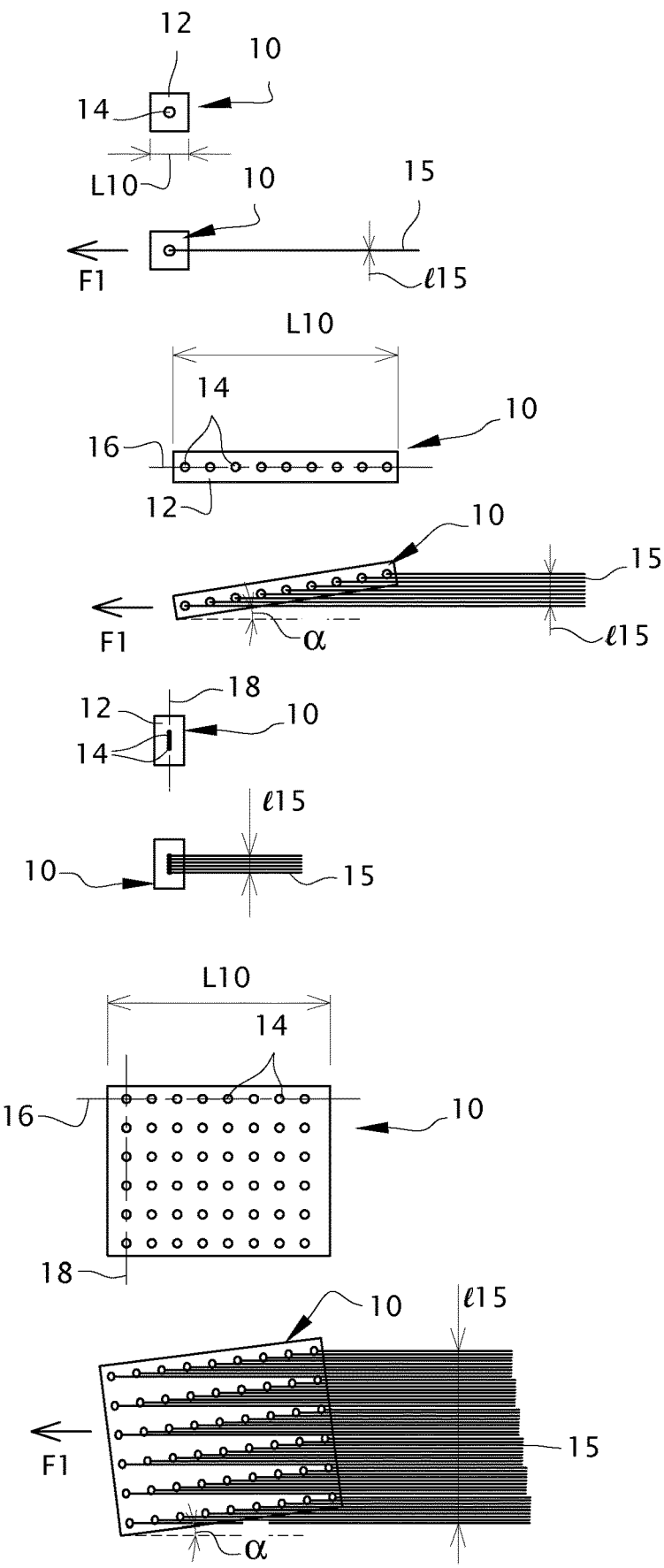
FIG. 2 shows diagrams of several print heads that may be used by the facility of FIG. 1, using the method of the invention.

As shown in the first example of FIG. 2, print head 10 may include a body 12 with a single print nozzle 14. In this case, when print head 10 is moved in the direction of arrow F1 in FIG. 2, print head 10 deposits a line or band of coating, which may be qualified as a brush 15, whose width $l15$, measured perpendicular to the direction of movement of the print head in the plane perpendicular to the nozzle 14, has a first value.

In the second example shown in FIG. 2, print head 10 includes a rigid body 12 on which is mounted a row 16 of eight nozzles 14, identified by its center line. Print head 10 may be moved parallel to arrow F1, being inclined at an angle α with respect to the direction of this arrow, so that the different lines of coating exiting nozzles 14 together define a continuous band 15 of coating applied to a surface, the width $l15$ of this band 15 having a second value equal to approximately eight times the first value.

In the third example shown in FIG. 2, print head 10 includes a column 18, identified by its center line, of six print nozzles 14 arranged on a rigid body 12. When print head 10 is moved perpendicular to this column, and provided that the nozzles are sufficiently close to each other, print head 10 deposits a continuous band 15 on a surface to be coated, the width $l15$ of this band having a third value, equal to about six times the first value.

In the fourth example shown in FIG. 2, rigid body 12 of print head 10 holds nozzles 14 arranged in six rows 16 and eight columns 18, identified by their respective center lines as in the second and third examples. In this case, nozzles 14 are very tightly arranged on rigid body 12, so that when print head 10 is moved parallel to arrow F1, being inclined at an angle α, as in the second example, the various nozzles 14 apply a band 15, the width of which $l15$ has a value equal to six times the second value.

The four types of print heads shown in FIG. 2 may be considered compact, in the sense that the bands of coating produced by the movement of one or the other of these heads in the direction of arrow F1 are continuous across the width.

Figure 3:
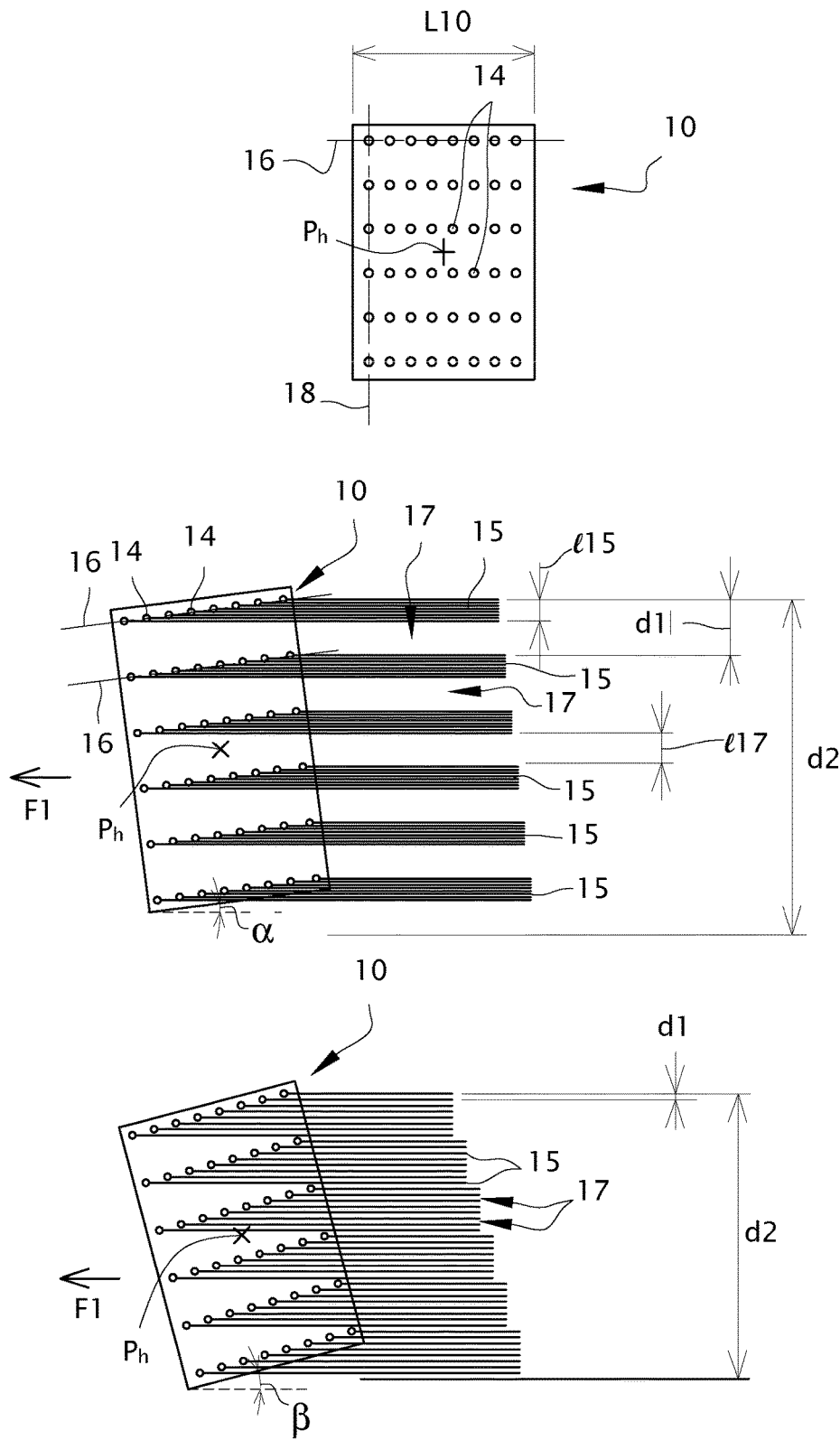
FIG. 3 is similar to FIG. 2, showing another print head that may be used by the facility in FIG. 1, using the method of the invention.

In the example shown in FIG. 3, print head 10 contains, on its rigid body 12, forty-eight nozzles 14 arranged into a configuration of six rows 16 and eight columns 18. A difference from the fourth example shown in FIG. 2 is that when print head 10 is moved parallel to arrow F1, six separate bands 15 are produced, each with a width $l15$ of comparable value to the second value mentioned above. These bands 15 are separate, in that between them are areas 17 where no coating is applied during movement of print head 10 in the direction of arrow F1, as shown in the center of FIG. 3.

Designate by $P_h$ the geometric center of the face of print head 10 on which nozzles 14 are mounted.

In the example of use shown at the bottom of FIG. 3, print head 10 is tilted at an angle β greater than angle α so that when print head 10 is moved parallel to arrow F1, forty-eight separate bands 15 of the type shown in the upper portion of FIG. 2 are applied, these bands being equally spaced, with between them areas 17 where no coating is applied.

Print head 10 in FIG. 3 has a non-compact configuration, such that bands 15 are not continuous over the entire width of the area where the coating is applied, since areas 17 remain between these bands, as explained above.

Designate by n the number of rows 16, and by m the number of columns 18 on print head 10. The number of nozzles 14 is n×m. In the example of FIG. 3, this number is 6×8=48.

Consider the configuration of FIG. 3, in which print head 10 is inclined by angle α. In this configuration, designate by d1 a distance measured parallel to width $l15$ of a band 15, therefore perpendicular to the direction of movement represented by arrow F1, between two adjacent rows of nozzles 16. Designate by $l17$ the width of an area 17, measured parallel to width $l15$. Distance d1 is equal to the sum of widths $l15$ and $l17$.

Regardless of the print head used, nozzles 14 each form an orifice from which the coating is sprayed, with a diameter of between 20 micrometers (μm) and 500 micrometers, preferably between 50 and 200 μm, and even more preferably on the order of 100 μm. The nozzle diameter produces the width of the individual band deposited by each nozzle, as in the configurations at the top of FIG. 2 and the bottom of FIG. 3, or the combined width of the bands formed by the juxtaposition of individual bands, as in the other configurations. In addition, nozzles 14 are each fed via a system for controlling the flow of the coating, which may be of the piezoelectric, electromagnetic, or pneumatic type.

The invention may be used with any of print heads 10 shown in FIGS. 2 and 3, and with variations thereof for the numbers of rows 16 and columns 18 and the numbers of nozzles per column or row, provided that all the rows have the same number of nozzles and all the columns have the same number of nozzles, meaning that the number of nozzles in each row corresponds to the number of columns, and the number of nozzles in each column corresponds to the number of rows.

For the print heads shown in FIG. 2, given how compactly nozzles 14 are mounted on print head 10, a continuous band of coating with a width of $l15$ on a surface S to be coated, or a portion thereof, with a single pass, that is to say one forward movement.

Figure 4:
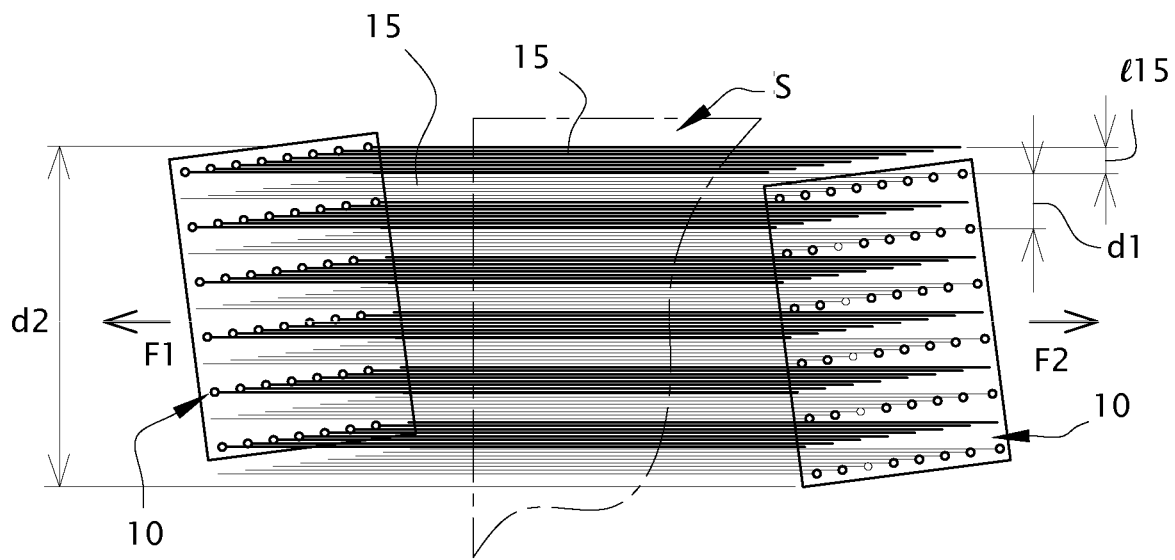
FIG. 4 shows the principle of back-and-forth movements of the print head of FIG. 3 to coat a surface with two examples of print head orientation.
Figure 4:
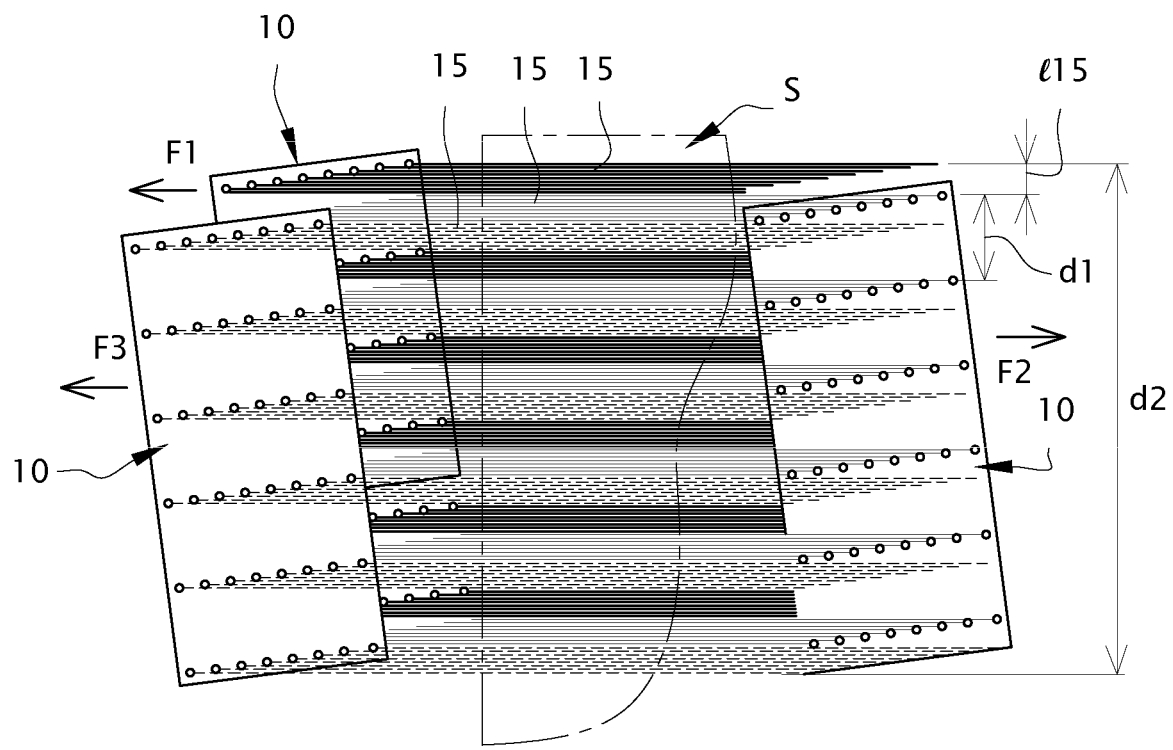

In the configuration shown in the middle of FIG. 3 and the upper portion of FIG. 4, width $l15$ represents half of distance d1, and a surface S to be coated, or a portion thereof, may be coated by moving print head 10 forward in the direction of arrow F1, then back in the direction of arrow F2.

In the configuration shown in the lower portion of FIG. 4, width $l15$ is equal to one-third of distance d1, and a surface S to be coated, or a portion thereof, may be completely coated by moving print head 10 forward in the direction of arrow F1, then back in the direction of arrow F2, then forward again in the direction of arrow F3.

The invention may be implemented with the various configurations of print head 10 envisaged above, the number of single or back-and-forth movements depending on the compactness of the print head, and thus on the configuration used. For the remainder of this description, it is assumed that print head 10 has n rows and m columns of nozzles 14. For example, with an inclined print head as shown in the middle portion of FIG. 3, one knows, as a function both of the distribution of the rows and columns 16 and 18, and of the angle of inclination α of body 12 with respect to the print head's direction of movement represented by arrow F1, F2, or F3, distance d1 between two rows of nozzles, as well as width $l15$ of band 15, and one may deduce the number of times print head 10 must move back and forth to completely cover surface S or a portion thereof, i.e.:

for a compact head such as shown in the lower portion of FIG. 2, the number of forward movements is 1 and the number of returns is 0, for a non-compact head with a d1/l15 ratio of 2, as shown in the middle portion of FIG. 3 or in the upper portion of FIG. 4, the number of forward movements is 1 and the number of returns is 1, for a non-compact head with a d1/I15 ratio of 3, as shown in the lower portion of FIG. 4 or in the upper portion of FIG. 4, the number of forward movements is 2 and the number of returns is 1.

Other numbers of back-and-forth movements of print head 10 are possible, depending on configuration of print head 10. For example, with an inclined print head as shown in the lower portion of FIG. 3, one knows, as a function both of the distribution of these rows and columns 16 and 18 and of the angle of inclination β of body 12 with respect to the print head's direction of movement represented by arrow F1, distance d1 between two consecutive nozzles in the same row, as well as width I15 of line 15 deposited by a nozzle 15, and one may deduce the number of times print head 10 must move back and forth.

The method of the invention will now be described with reference to FIG. 5 and the following figures.

Consider the left half of the upper surface of the roof of the vehicle body shown in FIG. 1 to be the surface to be coated S. As sees in FIG. 5, this surface S is delimited by the roof's front edge B1 and rear edge B2 and by a center line M which is the trace of plane n0 on the top of this roof. In FIG. 5, the center line represents the trace of the right half of the upper surface of the roof.

The surface to be coated S includes an area Z1 to be coated, and an area Z0 not to be coated. In addition, edges B1 and B2 are considered not to be coated, and are only shown in FIG. 5 for the sake of clarity.

Using a known technique, the surface to be coated S is modelled by a computer file F which, in the example, is in STL format. This format makes it possible to approximate the real surface S to be coated via a set of triangular facets, as shown in FIGS. 6-9.

Alternatively, file F may be in a different format, such as .obj or .vtk, which approximate the real surface via facets, or an .iges or .step format, which represent the mathematical shape of the surface to be coated S.

First, define the trajectory of the print head 10 and its orientation with respect to the surface to be coated S modelled by file F. The constraints of this trajectory are various:

- they relate to robot 20 that moves print head 10 and may be a multi-axis robot, a reciprocating robot, a plotting table, or a manipulator arm;
- they relate to print head 10, in particular to the number of nozzles 14, to the arrangement of these nozzles 14 on body 12, to the nozzle controls, the drop size of the coating product, etc.;
- they relate to the shape of the surface S to be coated, in particular to its curvature, to the geometry of its edges, to the presence of ribs, grooves or holes.

A calculation strategy is applied to generate the path of print head 10 with respect to the surface S modelled by file F.

This calculation strategy is applied in a calculator 40, shown in FIG. 1 in the form of a computer that communicates with ECU 30 and with controller 24. Calculator 40 works offline, time-shifted with respect to application of the coating product. In particular, at least some of the calculations by calculator 40 are performed before application of the coating product.

The strategy applied with calculator 40 includes a startup step 100 including selection of surface files from a file library, representing zones Z1 and Z0, to determine the outer contours of surface S, here edges B1 and B2, center line M and the left edge of surface S, followed by iterative definition of the inner surfaces, enabling the filling of each portion of surface defined between the outer contours by a spiral path or by a sweep motion.

As part of this strategy, and once surface S and its outer contours are defined and modelled in step 100, a 3-dimensional path is first defined for print head 10 based solely on the surface S to be coated and the configuration of print head 10, by conducting a forward or forward-return movement. This operation, as well as the other operations that are part of the method of the invention and that are described below, are applied automatically by calculator 40. Calculator 40 thus serves as an automatic path generator for robot 20.

To facilitate determination of the robot's path, a rule in the calculations performed by calculator 40 makes print head 10 remain more or less oriented in a predefined direction, such as towards a forward movement, supported by simple preselected elements such as points, segments or an edge.

The first step 102 'cuts' a section to be coated, in the surface to be coated S, more specifically in the file F that models surface S.

Figure 5:
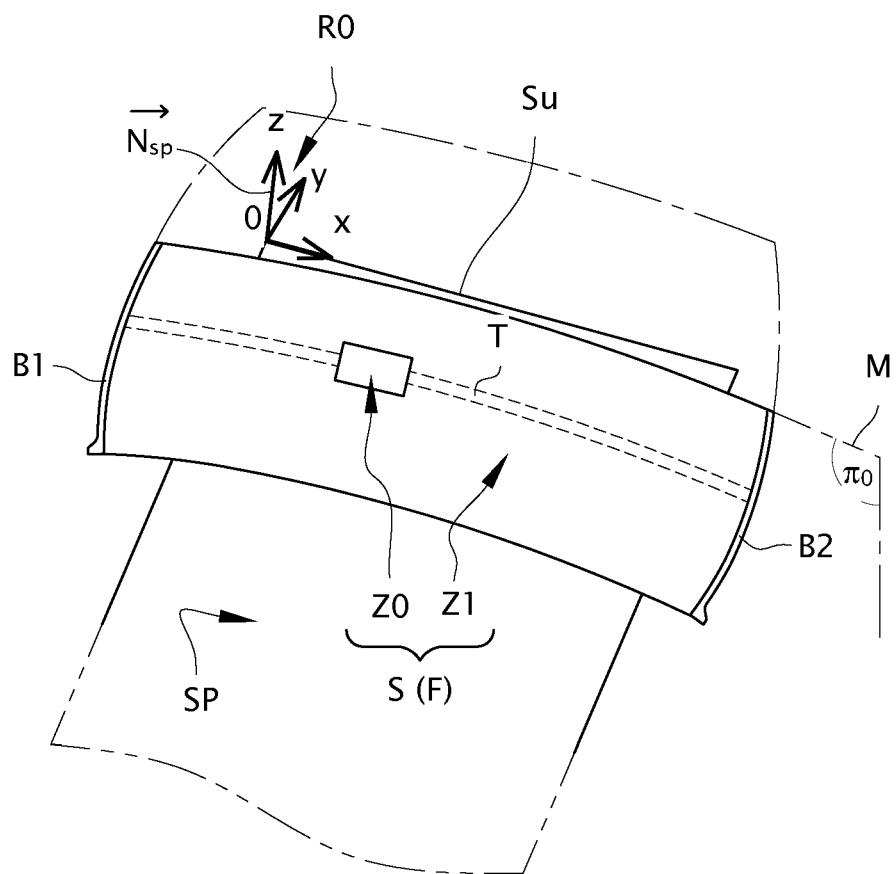
FIG. 5 shows the principle of a modelled surface to be coated and a supporting surface placed in the same modelled environment during an operation of the method of the invention.
Figure 11:
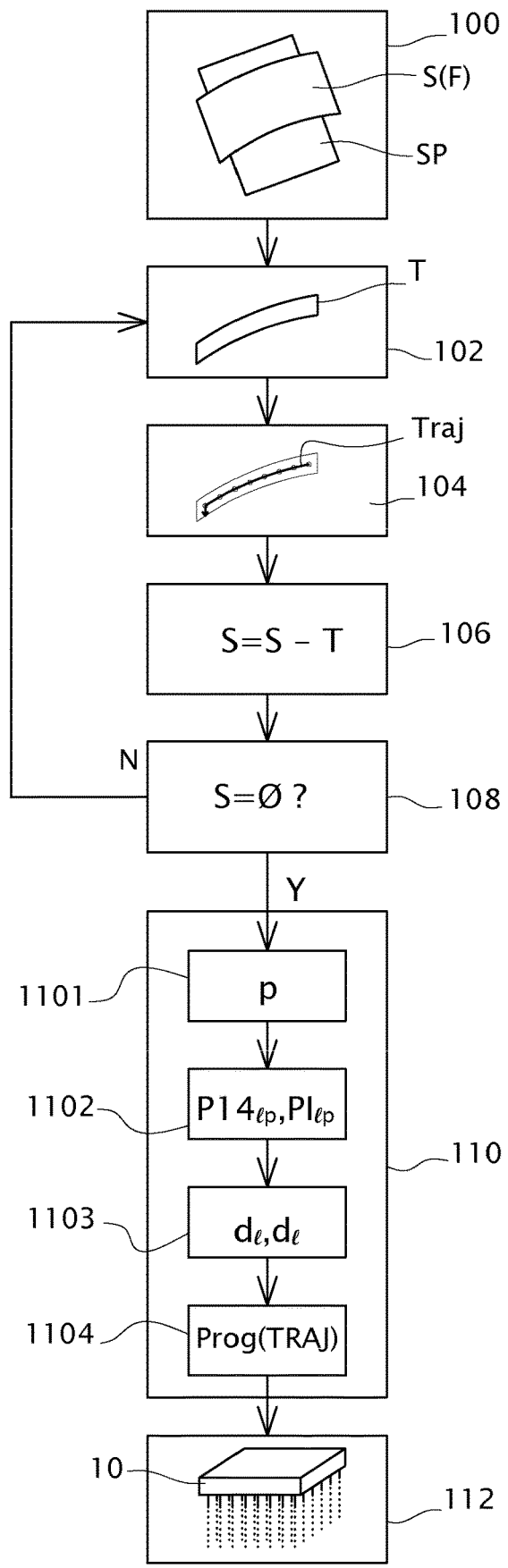
FIG. 11 is an overall block diagram of the method of the invention.
Figure 12:
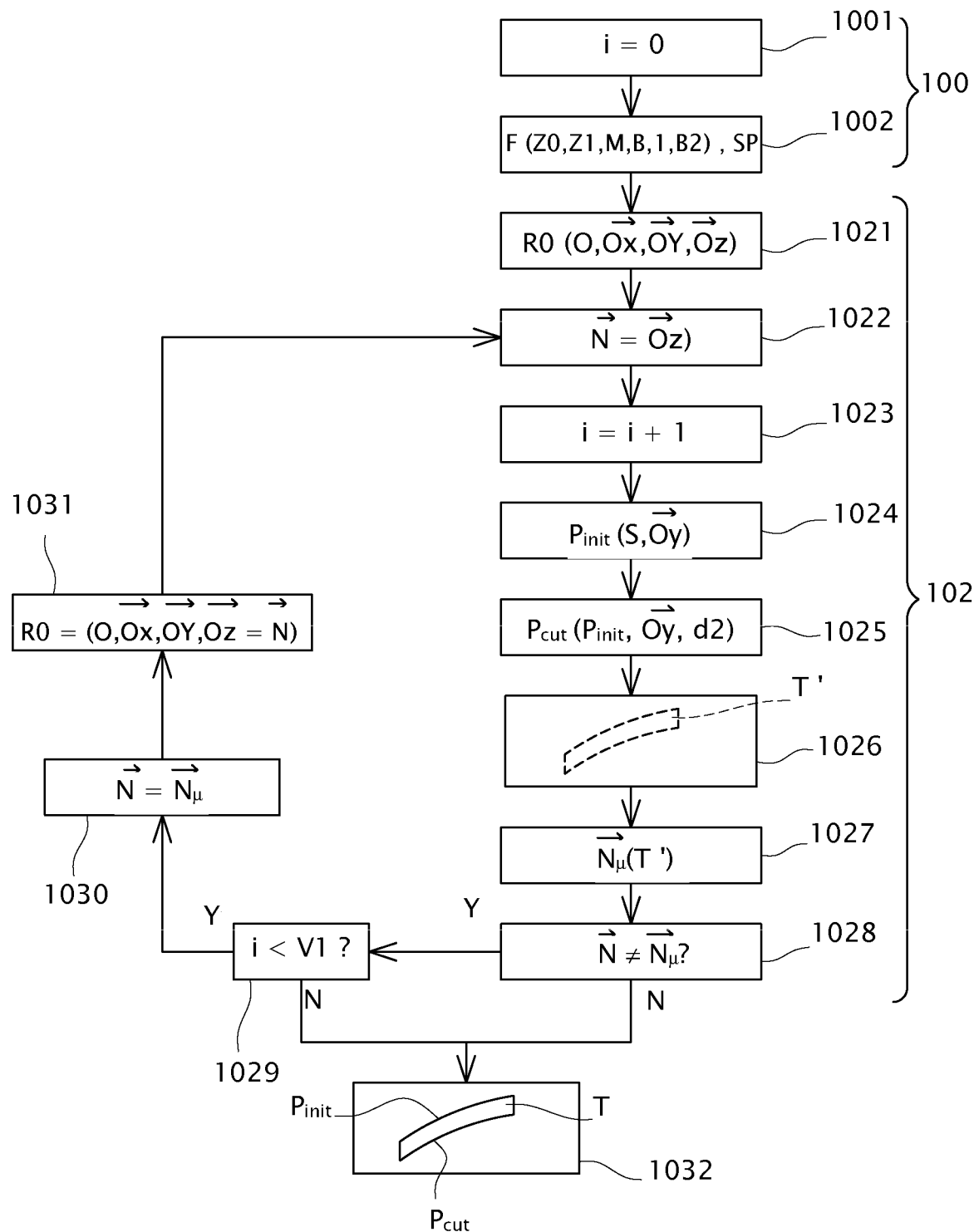
FIG. 12 is a detailed block diagram of an operation of the method of the invention.

As shown in FIGS. 5, 11 and 12, startup step 100 of the method of the invention first includes an initialization sub-step 1001, in which an iteration index i is zeroed, and a sub-step 1002 to adapt file F to surface S, in particular based on edges B1, B2 and M of surface S and zones Z1 and Z0, as well as a support surface SP located in the same calculation space as surface S, with a simple geometry defined by simple geometric elements, such as points, segments and faces.

In the example in the figures, surface SP is a flat rectangular surface located in the vicinity of surface S.

Figure 13:
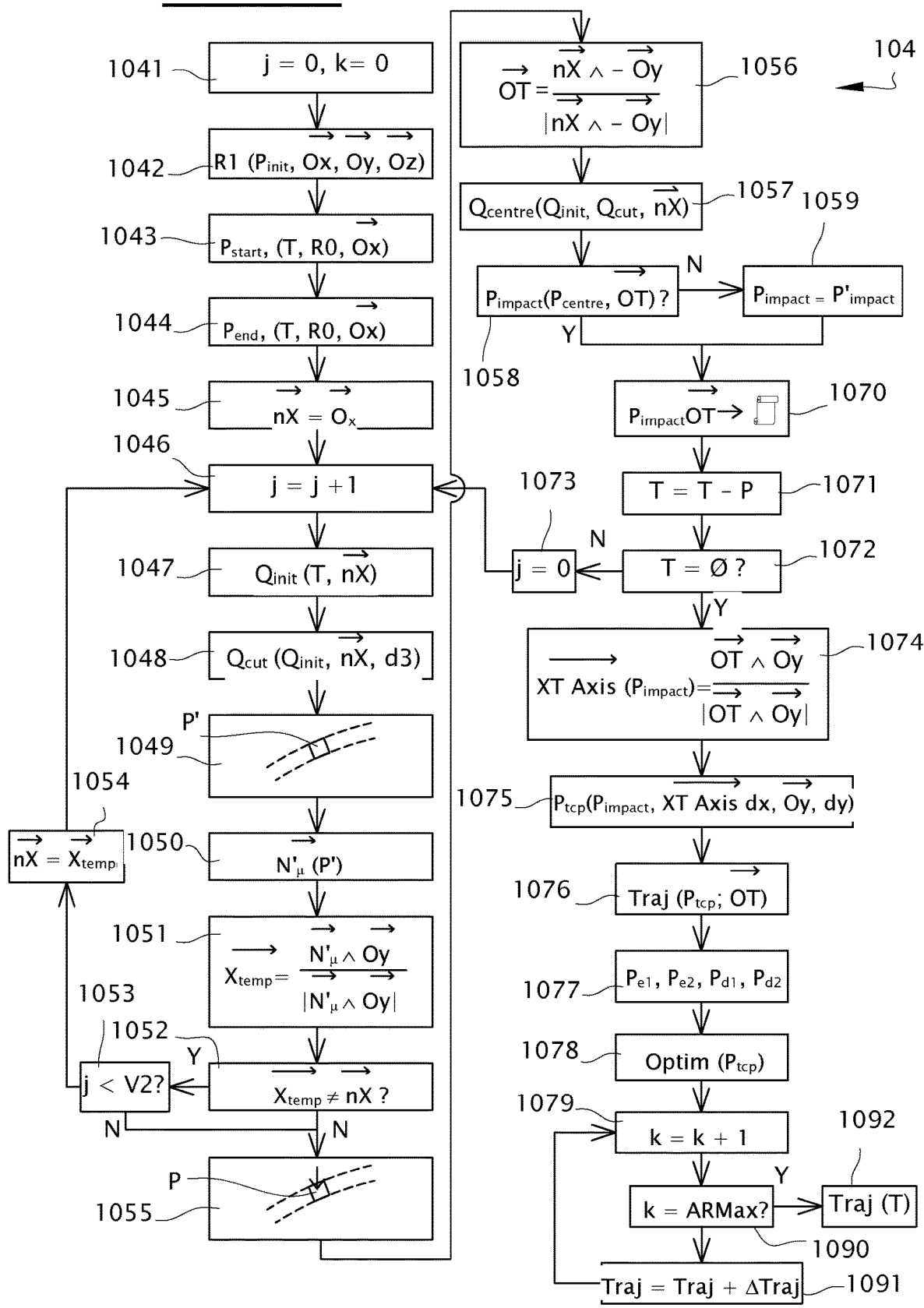
FIG. 13 is a detailed block diagram of another operation of the method of the invention.

In FIGS. 11-13, the parameters given in brackets after a quantity identified in a step or a sub-step are the parameters used to define this quantity.

By convention, the three orthogonal axes of an orthogonal coordinate system are called the X-axis, Y-axis and Z-axis.

Step 102 in the method of the invention includes defining a section T of the surface to be coated S, by calculation using file F. Step 102 is illustrated in FIG. 12 and includes an initial sub-step 1021 in which calculator 40 defines an initial orthogonal coordinate system R0 whose origin O is a point selected by the user in the support surface SP, such as with a pointing device like a mouse. In sub-step 1021, the Z-axis $\vec{Oz}$ of the first orthogonal coordinate system R0 is initially set to a normal $\vec{Nsp}$ on the support surface SP at the origin point O. On the other hand, the Y-axis $\vec{Oy}$ of the first orthogonal coordinate system O is set to the normalized cross product of the Z-axis $\vec{Oy}$ and an axis aligned on a travel direction selected by the user, by means of a segment SU of support surface SP selected by the user, such as with a pointing device, as approximately corresponding to a travel direction of print head 10 along center line M. Finally, the X-axis $\vec{Ox}$ of coordinate system R0 is set to the normalized cross product of the Y-axis $\vec{Oy}$ and the Z-axis $\vec{Oy}$.

Alternatively, the user may select the origin point O on a different surface, in this case surface S or in zones Z1 and Z0. Determination of the first orthogonal coordinate system R0 is then adapted based on this.

Overall, the method of the invention makes it possible to have print head 10 move parallel to segment SU, by adjusting the position of print head based 10 on the geometric model of surface S created by file F.

One uses a quantity known as the 'average normal' and designated $\vec{N}$. In a subsequent sub-step 1022 of step 102, calculator 40 initializes this average normal to the Z-axis $\vec{Oz}$ of the first orthogonal coordinate system.

In a subsequent sub-step 1023, index i is incremented by one unit.

Figure 6:
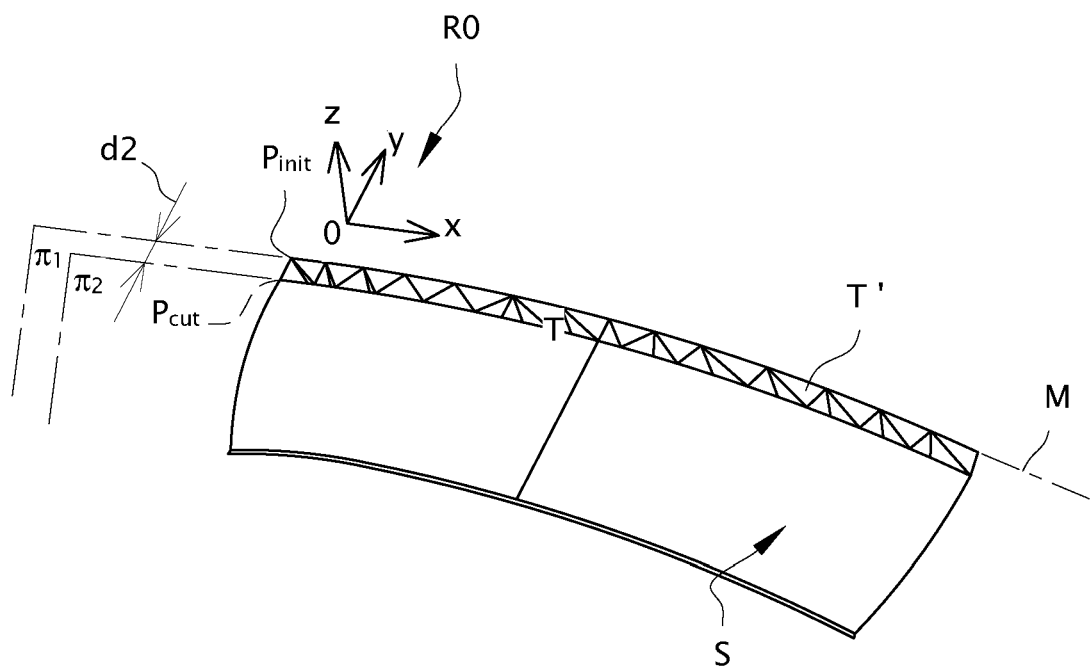
FIG. 6 shows the surface of FIG. 5 during a later operation of the method of the invention.

In a subsequent sub-step 1024, in an initial orthogonal coordinate system R0, calculator 40 defines a point $P_{init}$ as a point on the surface to be coated S whose ordinate there, in the first orthogonal coordinate system R0, is the greatest among those of the points on the surface to be coated. In other words, as seen in FIG. 6, point $P_{init}$ is the 'furthest' along the Y-axis $\vec{Oy}$, in coordinate system R0, amongst the points on the surface to be coated S. As shown schematically in brackets in FIG. 12, point $P_{init}$ is defined as a function of surface S and the Y-axis $\vec{Oy}$.

In a later sub-step 1025, based on point $P_{init}$, calculator 40 defines another point $P_{cut}$ as a point on the surface to be coated S that is located, with respect to the initial point $P_{init}$, at a distance d2 measured along the Y-axis $\vec{Oy}$ and in a negative direction along this axis. This second point $P_{cut}$ is called the cut point because it corresponds to a virtual cut on the surface to be coated S. More specifically, one uses a temporary section T' on the surface to be coated that is defined between two planes n1 and n2 passing through initial point $P_{init}$ and cut point $P_{cut}$, respectively, both of which are perpendicular to Y-axis $\vec{Oy}$, i.e., parallel to X-axis $\vec{Ox}$ and Z-axis $\vec{Oz}$. FIG. 6 shows this temporary section T'. Its width, measured along the axis $\vec{Oy}$, is equal to the distance d2.

In the example of the center part of FIG. 3 and FIG. 4, the distance d2 is set to the number n of rows 16 of nozzles 14 multiplied by the distance d1 between two rows. In the example at the bottom part of FIG. 3, distance d2 is set to the number n of rows 16 of nozzles 14 multiplied by the number m of columns 18 of nozzles multiplied by the distance d1 between two nozzle strokes. Thus, distance d2 is equal to the total width of beams 15 applied during a forward-return movement in the configuration shown in the top part of FIG. 4, and to the total width of beams 15 applied during a forward-return movement following by a forward movement in the configuration shown in the bottom part of FIG. 4. As with distance d1, distance d2 depends on widths I15 and I17 of beams 15 and areas 17, i.e., the value of angle α or β. In any case, distance d2 is a multiple of distance d1.

Next, in a sub-step 1027, calculator 40 calculates the average normal $\vec{N\mu}$ on the surface to be coated S between planes n1 and n2, i.e., on the temporary section T'.

After sub-step 1027, at a sub-step 1028 calculator 40 compares the average normal $\vec{N}$ defined at step 1022 and the average normal $\vec{N\mu}$ defined at step 1027. This comparison between two vectors may be performed in several ways, such as by determining an angle between these two normals, by finding their scalar product. In the case of a comparison using an angle determined between these vectors, these vectors are considered identical if the absolute value of this angle is less than a limit value, and different if the absolute value of this angle is greater than this limit value. This limit value can be set between $10^{-9}$° and 10°, and preferably to $10^{-6}$°.

Depending on the result of the comparison at sub-step 1028, calculator 40 applies different sub-steps.

If the result of the comparison in sub-step 1028 is that the two average normals are different, a sub-step 1029 verifies that index i is strictly less than or equal to a threshold value V1. If this is the case, the variable $\vec{N}$ takes the value $\vec{N\mu}$ at sub-step 1030, then the first orthogonal coordinate system R0 is redefined at step 1031, in a manner similar to step 1021, but according to the sequence below: the Y-axis $\vec{Oy}$ of the new orthogonal coordinate system R0 is obtained by normalizing the vector resulting from the cross product of $\vec{N}$ and the X-axis $\vec{Ox}$ of the first orthogonal coordinate system R0. The Z-axis $\vec{Oz}$ of the new orthogonal coordinate system R0 is set to $\vec{N}$. The X-axis $\vec{Ox}$ of the new orthogonal coordinate system R0 is obtained by normalizing the vector resulting from the cross product of $\vec{N}$ and the Y-axis $\vec{Oy}$ of the new orthogonal coordinate system R0. Next, sub-steps 1022-1028 are applied again until vectors $\vec{N}$ and $\vec{N\mu}$ are considered equal at step 1028 or the maximum number of iterations V1 is reached, in which case calculator 40 defines the last temporary section T' defined in the last sub-step 1026 performed, as section T on the surface to be coated. This occurs during a sub-step 1032 that is the final sub-step of step 102 of the method of the invention.

In practice, threshold value V1 that is the maximum number of iterations in step 102, may be set between 1 and 20, and preferably to 5.

Figure 7:
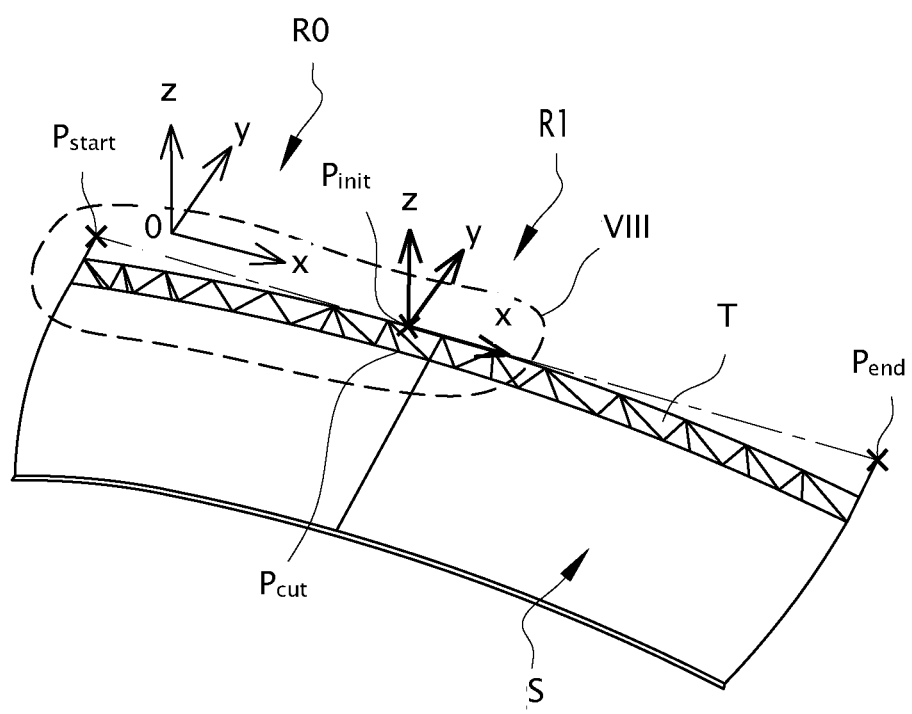
FIG. 7 shows the same surface as that shown in FIGS. 5 and 6 during a later operation of the method of the invention.

In sum, step 102 enabled 'cutting' a section T in surface S, as this section is well defined, between the first and second planes n1 and n2 passing through points $P_{init}$ and $P_{cut}$, respectively. These points are not necessarily located on an edge of surface S, but may be located in an intermediate portion of this surface, away from edges B1 and B2 as shown in FIG. 7, following iterative application of sub-steps 1022-1031.

Once section T has been determined at step 102, the method of the invention uses an automatic calculation and iterations, over the course of a step 104, to define a path Traj for the print head to follow with respect to this section T.

Step 104 is detailed in FIG. 13 and first includes an initialization sub-step 1041 by zeroing two indexes: index j and index k.

During a subsequent sub-step 1042, calculator 40 defines a second orthogonal coordinate system R1 whose origin is the initial point $P_{init}$ defined at the last sub-step 1024 performed and whose X, Y and Z-axes are the same as those of the last version of the first orthogonal coordinate system R0 defined at step 1021 or step 1031.

In a subsequent sub-step 1043, calculator 40 defines a third point $P_{start}$, referred to as the 'start point'. This third point is the X-axis projection $\vec{Ox}$ of the second orthogonal coordinate system R1 of a point of the section to be coated T with the smallest abscissa in the first orthogonal coordinate system R0.

Similarly, at sub-step 1044, calculator 40 defines a fourth point $P_{end}$, referred to as the 'end point'. This fourth point is the X-axis projection $\vec{Ox}$ of the second orthogonal coordinate system R1 of a point of the section to be coated T with the greatest abscissa in the first orthogonal coordinate system R0.

The third and fourth points can be used to identify a travel direction for print head 10.

The order of sub-steps 1043 and 1044 may be reversed. Alternatively, these sub-steps may be performed simultaneously. In another variant, steps 1043 and 1044 are not applied.

FIG. 7 shows the third and fourth points, as well as the two coordinate systems: R0 and R1.

At sub-step 1045, calculator 40 initializes a variable $\overrightarrow{nX}$ that is referred to as a new axis X, as the X-axis of the second orthogonal coordinate system R1. This sub-step 1045 may be performed before or after sub-steps 1043 and 1044, or even at the same time.

Next, in a sub-step 1046, index j is incremented by one unit.

In a subsequent sub-step 1047, in a second orthogonal coordinate system R1 calculator 40 defines a fifth point $Q_{init}$, which is referred to as the initial point of the section, as a point on section T with the smallest abscissa in the second orthogonal coordinate system R1 among the points on the section to be coated. In other words, in this sub-step 1047, the fifth point $Q_{init}$ is defined as the point on section T that has travelled the least along the X-axis in the second orthogonal coordinate system R1.

In a subsequent sub-step 1048, calculator 40 defines a sixth point $Q_{cut}$, which is referred to as the cut point of section T and which is a point on this section located, with respect to the fifth point and along the new axis $\overrightarrow{nX}$, at a given distance d3. For instance, distance d3 may be equal to the length L10 of print head 10 measured parallel to a row 16. Alternatively, distance d3 may be much less than this length, such as one tenth of it, or much greater, such as one hundred times this length. In practice, distance d3 may be selected based on the local curvature of section T of the surface to be coated S with respect to length L10 of print head 10, as this curvature may be calculated based on file F.

Figure 8:
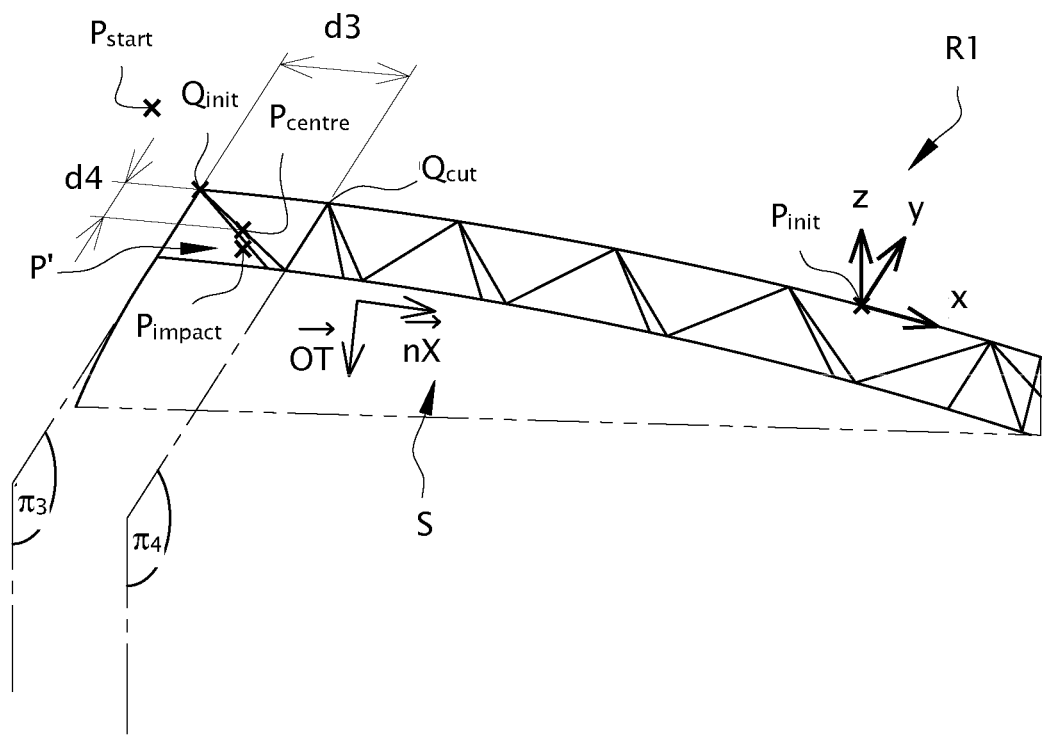
FIG. 8 shows a close-up view of area VIII in FIG. 7 during a later operation of the method of the invention.

In a subsequent sub-step 1049, calculator 40 defines a temporary portion P' of section T as the portion of this section between a third plane n3 and a fourth plane n4 perpendicular to the new axis $\overrightarrow{nX}$ and passing through the fifth and sixth points $Q_{init}$ and $Q_{cut}$, respectively. FIG. 8 shows this portion P' of section T.

If a temporary portion P' of section T was defined in sub-step 1049, as indicated above, the average normal $\overrightarrow{N'\mu}$ at this portion P' is calculated in a sub-step 1050.

In a subsequent sub-step 1051, calculator 40 calculates a variable for the temporary longitudinal axis $\overrightarrow{Xtemp}$ equal to the cross product of the average normal $\overrightarrow{N'\mu}$ calculated in sub-step 1050 and of the opposite $-\overrightarrow{Oy}$ of the Y-axis $\overrightarrow{Oy}$ of the second orthogonal coordinate system R1, as this cross product is normalized, i.e., scaled to a length of 1.

In a subsequent sub-step 1052, calculator 40 compares the new X-axis $\overrightarrow{nX}$ defined previously and the temporary longitudinal axis $\overrightarrow{Xtemp}$ defined at step 1051. The comparison method may be the same as that applied at step 1028 mentioned above, or a different method enabling comparison of two vectors.

If the result of the comparison at sub-step 1052 is that the two vectors compared are different, the system applies a sub-step 1053 to compare index j to a threshold value V2. If index j is strictly less than threshold value V2, then the new axis $\overrightarrow{nX}$ takes the value $\overrightarrow{Xtemp}$ at sub-step 1054, and step 104 is resumed at sub-step 1046 to return to sub-step 1052. Thus, an iteration method is applied, for j between 1 and V2, as long as vectors $\overrightarrow{Xtemp}$ and $\overrightarrow{nX}$ are different.

If vectors $\overrightarrow{Xtemp}$ and $\overrightarrow{nX}$ are found to be equal at step 1052, or if the maximum number of iterations V2 is reached at sub-step 1053, then a new sub-step 1055 is applied that defines a portion P of the section to be coated T as equal to the last temporary portion P' defined at the last sub-step 1049 performed.

Thus, sub-steps 1041-1055 enable definition, by iteration, of a portion P of section T cut between $Q_{init}$ and $Q_{cut}$, through which planes n3 and n4 pass, which are perpendicular to the new X-axis $\overrightarrow{nX}$.

The user may select threshold value V2 for threshold value V1. In practice, threshold value V2 may be set between 1 and 20, and preferably to 5.

After step 1055, a sub-step 1056 is applied in which calculator 40 calculates an orientation vector $\overrightarrow{OT}$ for print head 10, which is equal to the normalized cross product of the new X-axis $\overrightarrow{nX}$ and the opposite $-\overrightarrow{Oy}$ of the Y-axis $\overrightarrow{Oy}$ of the second orthogonal coordinate system R1.

In a subsequent sub-step 1057, calculator 40 calculates the position of a seventh point $P_{center}$, referred to as the center point, located halfway between the orthogonal projections of the fifth and sixth points $Q_{init}$ and $Q_{cut}$ on a line passing through the fifth point $Q_{init}$ and of a direction vector equal to the new axis $\overrightarrow{nX}$. This center point $P_{center}$ is offset, with respect to this line passing through these two points, by a third distance d4 measured along the Y-axis $\overrightarrow{Oy}$ of the second orthogonal coordinate system R1, in a negative direction on this axis. This third distance d4 is set to half of first distance d2, and the point $P_{center}$ is roughly halfway between the first and second planes n1 and n2 mentioned above.

In a subsequent sub-step 1058, the seventh point $P_{center}$ is projected along a line whose direction vector is the orientation vector $\overrightarrow{OT}$ on the portion P of section T in the form of an eighth point $P_{impact}$, referred to as the impact point. At sub-step 1058, this eighth point $P_{impact}$ is only created if an intersection occurs between the line of the direction vector $\overrightarrow{OT}$ and the application point $P_{center}$, and portion P of section T, which includes a full zone, i.e., full of the material, with respect to the seventh point and the orientation axis $\overrightarrow{OT}$. This is the case for the first seven portions P1 to P7 of section T, shown in FIG. 9.

According to a variant of the method of invention that is not shown, the eighth point $P_{impact}$ may be defined without using the seventh point $P_{center}$, but by taking an imaginary line made up of the intersection of a first imaginary plane and a second imaginary plane. The first imaginary plane is located halfway between planes n1 and n2, while the second imaginary plane is located halfway between planes n3 and n4. Point $P_{impact}$ exists if this imaginary line intersects a full zone in portion P of section T.

Figure 9:
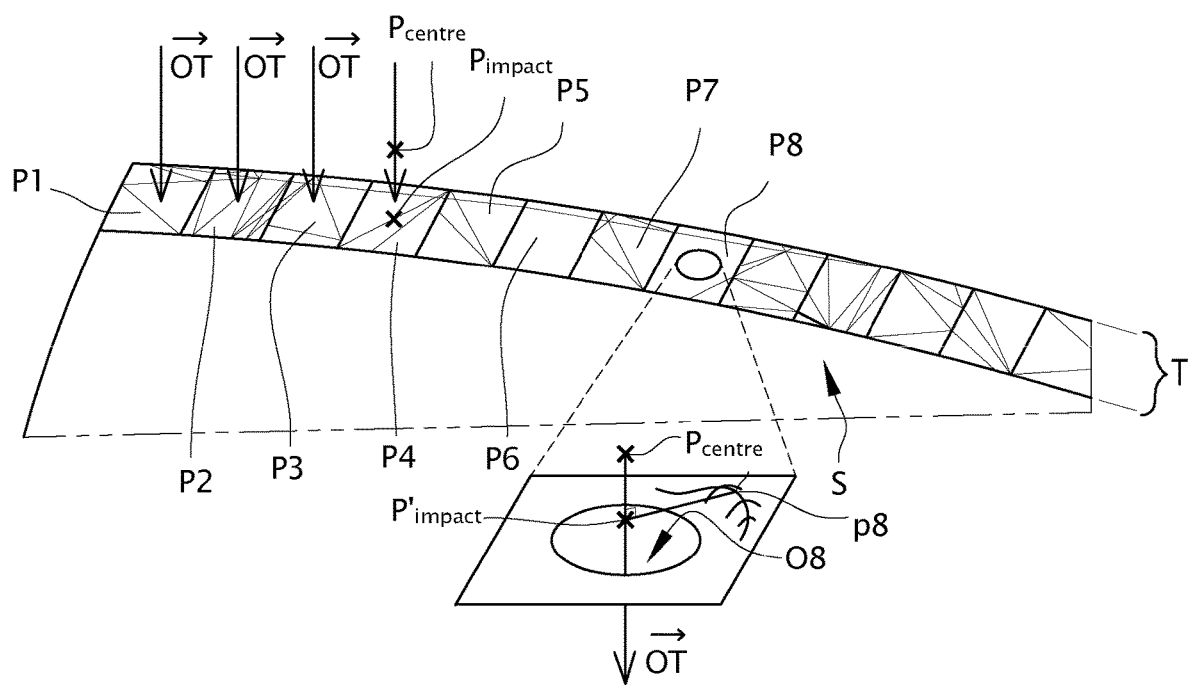
FIG. 9 shows the same close-up view during a later operation of the method of the invention.

In the case of the eighth portion P8 shown in the magnification in FIG. 9, the projection of the seventh point falls in a port O8 that crosses portion P8. In this case, a point $P'_{impact}$ is defined, as an alternative to the eighth point $P_{impact}$. To define this alternative point $P_{impact}$, calculator 40 takes a ninth point, namely the end point p8 of portion P8 which is the furthest away in the opposite direction of the orientation vector of the head $\overrightarrow{OT}$. In the example of FIG. 9, this ninth point p8 is located at the 'vertex' of a boss of portion P8. This point p8 is then projected perpendicularly on an axis passing through point $P_{center}$ and parallel to the orientation axis of the head $\overrightarrow{OT}$. The result of this projection is defined as the tenth point $P_{impact}$, as an alternative to the eighth point $P_{impact}$. As the eighth point $P_{impact}$ cannot be constructed using the approach referred to at step 1058, a sub-step 1059 uses the tenth point $P_{impact}$ as the eighth point $P_{impact}$. In other words, in this case, the eighth point $P_{impact}$ is considered equal to the tenth point $P'_{impact}$.

At the end of steps 1058 and 1059, calculator 40 stores the eighth point $P_{impact}$ and the orientation axis $\overrightarrow{OT}$ in a storage unit linked to this calculator, which is not shown.

According to a variant of the method of invention that is not shown, the eighth point $P_{impact}$ is always determined as explained above for the case of the eighth portion P8. In other words, it does not matter whether or not the line passing through the seventh point $P_{center}$ or the imaginary line intersects a full part of portion P1, P2, etc., under consideration. The tenth point $P_{impact}$ is always used.

Thus, sub-steps 1056-1070 enable calculation and storage of a theoretical impact point of a jet of coating product onto portion P defined in sub-step 1055, as well as an orientation axis $\overrightarrow{OT}$ of the print head for this impact point.

In a subsequent sub-step 1071, portion P of section T, in which the impact point and orientation vector were calculated, is removed from section T, and step 104 resumes at sub-step 1046, after zeroing index j, in a sub-step 1073.

As shown in sub-step 1072 in FIG. 13, the series of sub-steps 1046-1071 is applied as long as the area of section T is not zero.

Alternatively, the reduction of section T of the surface to be coated S, performed at step 1071 by removing portion P defined at step 1055, may be replaced with a sub-step that removes a fraction, from section T, that starts at point $Q_{init}$ and extends over a travel distance Advance defined by the user. To do this, calculator 40 starts from point $Q_{init}$ and adds distance Advance along the new axis $\overrightarrow{nX}$, then calculator 40 replaces section T with the part of the section located beyond distance Advance with respect to point $Q_{init}$.

Whether by removing portion P identified at step 1055 or by means of the part determined using variables $Q_{init}$, $\overrightarrow{nX}$ and Advance, a fraction of section T is removed at step 1071.

It is understood that the iterative method applied between sub-steps 1046 and 1072 enables gradual treatment of section T and storage, at step 1070, of a point and an axis for each portion considered, P or equivalent, of the section T.

This leads to the configuration in FIG. 9 where an impact point $P_{impact}$ or an alternative impact point $P'_{impact}$ is defined for each portion of surface P1, P2, etc., with an orientation axis at this point, OT.

Once the entire surface of section T has undergone treatment in sub-steps 1046-1071, i.e., once sub-step 1072 determines that the area of section T is zero, calculator 40 determines, for each eighth point and at a sub-step 1074, an axis vector $\overrightarrow{AxeXT}$ of print head 10 at this impact point as equal to the normalized cross product of the orientation vector $\overrightarrow{OT}$ of print head 10 at this point and the Y-axis $\overrightarrow{Oy}$ of the second orthogonal coordinate system R1.

Figure 10:
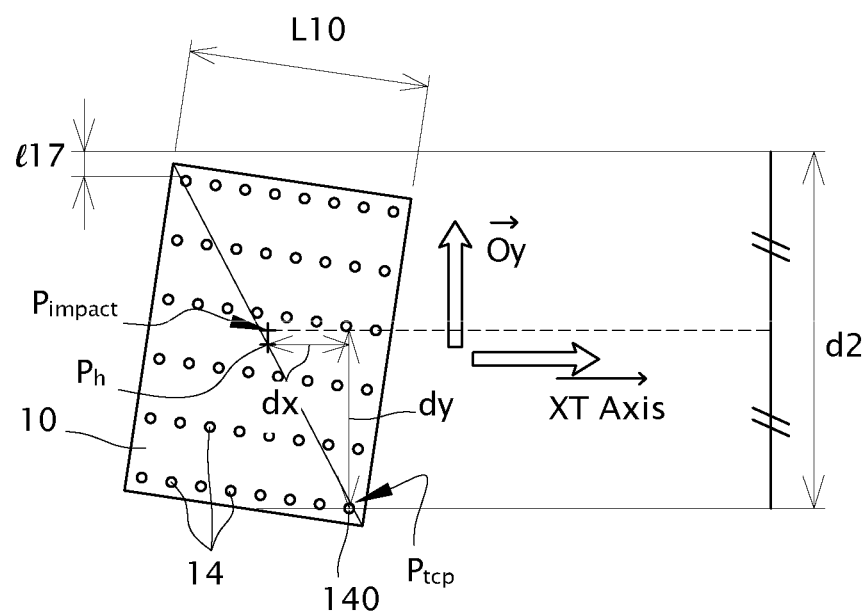
FIG. 10 shows a front view of the print head and some sizes used in the method of the invention.

At a subsequent sub-step 1075, calculator 40 uses the eighth point $P_{impact}$ to define a remarkable point $P_{tcp}$ to reach, referred to as the 'tool center point', which is a reference point for spatial positioning of print head 10. More specifically, as shown in FIG. 10, the eighth point $P_{impact}$ is considered to be located, with respect to print head 10, at half the distance d2 defined above and in a position such that points $P_{impact}$ and $P_h$ are aligned along the axis $\overrightarrow{Oy}$. A reference nozzle 140 is designated among the nozzles 14, such as the nozzle located in the bottom right corner of print head 10 in FIG. 10. Nozzle 140 may be defined as the tool center point or point $P_{tcp}$. The offset dx is noted, parallel to the axis vector $\overrightarrow{AxeXT}$, between points $P_h$ and $P_{tcp}$. As points $P_{impact}$ and $P_h$ are aligned along the axis $\overrightarrow{Oy}$, the offset dx is also the offset parallel to the axis vector $\overrightarrow{AxeXT}$, between points $P_{impact}$ and $P_{tcp}$. The offset dy is noted between points $P_{impact}$ and $P_{tcp}$ parallel to the Y-axis $\overrightarrow{Oy}$ of the second orthogonal coordinate system R1, in a negative direction.

Under these conditions, the position of the reference nozzle 140 may be considered to be the position of the characteristic point $P_{tcp}$ expressed as a function of the position of the impact point $P_{impact}$ according to the equation:

$$P_{tcp} = P_{impact} + dx \times \overrightarrow{AxeXT} - dy \times \overrightarrow{Oy} \quad \text{(Equation 1)}$$

If a point $P_{tcp}$ is defined, it is included, with the orientation axis of the head $\overrightarrow{OT}$, in file Traj for the path for the reference nozzle 140 to follow with respect to section T of the surface to be coated S, in a sub-step 1076 following step 1075. This successively records the different characteristic points $P_{tcp}$ and the different orientation axes of the head $\overrightarrow{OT}$, corresponding to the different portions P or fractions of section T, in the path file Traj.

Alternatively, sub-steps 1074-1076 may be applied between sub-steps 1070 and 1071, or even at the same time as sub-step 1070.

According to an optional sub-step of the invention 1077, it is possible to add, to the path file Traj, at least one additional engagement point and at least one additional release point for the print head on the path to be completed along section T. In practice, two additional engagement points, $P_{e1}$ and $P_{e2}$, and two additional release points, $P_{d1}$ and $P_{d2}$, are added to the path file created for each section T. The two engagement points $P_{e1}$ and $P_{e2}$ are collinear with the first two points $P_{tcp}$ of the path Traj and are located at a parametrized distance from these first two points. Similarly, the two release points $P_{d1}$ and $P_{d2}$ are collinear with the last two points $P_{tcp}$ on the path and located at a parametrized distance from it. The two parametrized distances used for the engagement and release points may be the same or different.

If the path file generated for a section T contains a single point $P_{tcp}$, the axis $\overrightarrow{AxeXT}$ is used to define the engagement point(s) and the release point(s) based on this single point.

Alternatively, and according to an approach that offers more flexibility in the method of engaging print head 10 on path Traj, engagement points $P_{e1}$ and $P_{e2}$ are defined by the fact that points $P_{e1}$, $P_{e2}$ and $P_{tcp}$, corresponding to the first point on the path Traj, are collinear, and by the fact that the line on which they are located is parallel to the vector defined by the cross product of the first orientation axis of the head $\overrightarrow{OT}$ for the path Traj and the Y-axis $\overrightarrow{Oy}$ of the second orthogonal coordinate system R1. Similarly, and according to an approach that offers more flexibility in the method of releasing print head 10 from the path Traj, release points $P_{d1}$ and $P_{d2}$ are defined by the fact that points $P_{d1}$, $P_{d2}$ and $P_{tcp}$, corresponding to the last point on the path Traj, are collinear and by the fact that the line, on which they are located, is parallel to the vector defined by the cross product of the last orientation axis of the head $\overrightarrow{OT}$ for the path Traj and the Y-axis $\overrightarrow{Oy}$ of the second orthogonal coordinate system R1.

The number of engagement and release points is not necessarily equal to two. As mentioned above, it can be equal to 1. It may also be greater than or equal to 3. The number of engagement points is not necessarily equal to the number of release points.

In a subsequent sub-step 1078, calculator 40 performs an optimization of the number of points $P_{tcp}$ of the trajectory file Traj. In this context, if three successive $P_{tcp}$ points of the trajectory file are collinear and their orientation axes $\overrightarrow{OT}$ are parallel, then the intermediate point $P_{tcp}$ of note is removed from the trajectory file, as well as the head orientation vector $\overrightarrow{OT}$ associated with this point. This optimization sub-step makes it possible to reduce the number of $P_{tcp}$ points of the trajectory according to the collinearity of these points in space, and to avoid an overload of the calculation capacities of calculator 40.

Sub-step 1078 is optional. It may or may not be implemented depending on the number of points $P_{tcp}$ in each trajectory file Traj, and the computing capabilities of calculator 40.

In the subsequent sub-steps 1079-1091 of step 104, the number of forward and backward strokes to be made to coat strip T of surface S is taken into account. The explanations provided above with reference to FIGS. 3 and 4 apply, mutatis mutandis, to the coating of a strip T of the surface S to be coated.

The Ar max value is defined as the sum of the number of forward and backward strokes required to cover the strip T with the print head. In the case shown in the lower part of FIG. 2, the Ar max number is equal to 1. In the case shown in the middle part of FIG. 3 and at the top of FIG. 4, the Ar max number is equal to 2. In the case shown in the lower part of FIG. 4, the Ar max number is equal to 3.

The index k, initialized at zero at step 1041 and incremented by 1 at step 1079, represents a sequence number of the trajectory to be taken, whether it is a forward stroke, when k is odd, or a backward stroke, when k is even. The file corresponding to the trajectory T is presented in practice as an array of points $P_{tcp}$ and associated vectors $\overrightarrow{OT}$. When passing from index k−1 to index k, the calculator 40 duplicates the array created at step 1076.

If k is even, calculator 40 inverts the duplicated array, i.e., changes the order of the remarkable points $P_{tcp}$, respectively the associated vectors $\overrightarrow{OT}$, so that the first points, respectively the first vectors, become the last and vice versa. For each remarkable point $P_{tcp}$, calculator 40 shifts it in the direction opposite to the ordinate axis $\overrightarrow{Oy}$ of the second orthogonal rule R1, by a distance d5 equal to the value of k−1, multiplied by width l15 of a beam In other words, the points $P_{tcp}$ are shifted by distance d5=(k−1)×l15. The set of new points obtained and the orientation vectors $\overrightarrow{OT}$, which are not modified for these different points, form a return section of the trajectory, along section T. This new section Δtraj of trajectory Traj is added to the existing trajectory in a sub-step 1091.

If k is odd and different from 1, the order of the points $P_{tcp}$ is maintained with respect to that determined in sub-step 1076, i.e., reversed with respect to that of the trajectory section Δtraj determined for the index k−1 which is even, and the various points $P_{tcp}$ are shifted, with respect to the last calculation carried out and in the direction opposite to the axis $\overrightarrow{Oy}$ of the second orthogonal rule R1, by the same distance d5. The set of new points obtained and the orientation vectors $\overrightarrow{OT}$, which are not modified for these different points, form a new forward section of the trajectory, along the section T. This new section Δtraj of the trajectory Traj is added to the existing trajectory in a sub-step 1091.

Thus, for k between 2 and Ar max, each section Δtraj added to the trajectory is calculated by reversing the order of the remarkable points $P_{ctp}$ defined for the previously calculated trajectory section.

When the maximum number of forward and backward strokes is reached at step 1090, the complete trajectory for the T-strip is generated in a sub-step 1092 of step 104.

According to an aspect of the invention not shown, if a zone not to be coated is present on surface S, as represented by zone Z0 in FIG. 5, the trajectory of the robot is adjusted so as not to collide with this zone Z0. A strip T of surface S that intersects a zone not to be coated Z0 is considered. When calculator 40 proceeds with the calculations of the above-mentioned step 104, if, for one of the remarkable points $P_{tcp}$, its projection $P_{tcp/proj}$ according to the orientation vector $\overrightarrow{OT}$ on the zone Z0 not to be coated exists, and if a vector going from the point $P_{tcp}$ to the point $P_{tcp/proj}$ is in the opposite direction to the orientation vector $\overrightarrow{OT}$, calculator 40 considers this to mean that the remarkable point $P_{tcp}$ is in collision with zone Z0 not to be coated. In this case, a shift, of adapted amplitude, is applied to the position of remarkable point $P_{tcp}$ in order to move it away from the surface to be coated S, to the level of the area not to be coated Z0, in a direction opposite to the orientation vector $\overrightarrow{OT}$. In other words, at zone Z0 not to be coated, the trajectory to be followed by print head 10 is adapted so as not to hit the object to be coated O, i.e., to avoid a collision between print head 10 and object O.

The approach implemented, at zone Z0 not to be coated, to avoid a collision between print head 10 and the object to be coated O, may also be implemented for the zone to be coated Z1. When step 104 has been implemented, with possibly an adaptation at the level of a zone Z0 not to be coated as mentioned above, a step 106 is implemented by calculator 40 which consists of automatically removing from modelling file F, by computation, the strip to be coated T taken into account during the previous steps 102 and 104, before starting again at step 102.

Alternatively, at step 106, calculator 40 creates a new modelling file F which corresponds to the modelling file F from which the strip T has been removed. This is equivalent to removing strip T from file F.

In other words, trajectory generation is carried out by successive iterations, each corresponding to a strip T, these T strips being removed from file F as the corresponding trajectories Traj are determined.

This is done until the area of the surface to be coated S modelled in file F is zero, i.e., the successive removal of the different strips T corresponds to the total elimination of the surface S in the file F. This is evaluated at step 108. As long as the area detected at step 108 is not zero, steps 102-106 are implemented iteratively.

At the end of step 108, a global trajectory file TRAJ is available containing a set of remarkable points $P_{tcp}$ to be reached by the reference nozzle 140 of print head 10, with, at each remarkable point, an orientation vector $\overrightarrow{OT}$ of the print head to be respected, this trajectory file including Traj trajectories corresponding to the possible forward and backward strokes to be made on each strip T.

In order to avoid any risk of interference between print head 10 and the physical surface of the object O to be coated, a systematic offset is preferably applied by controller 24 to all points $P_{tcp}$ of each trajectory Traj, for example, an offset of 10 mm in a direction opposite to the orientation vector $\overrightarrow{OT}$ associated with the point $P_{tcp}$. In effect, controller 24 uses points $P_{tcp}$ to construct a set of points further from the surface S than these points $P_{tcp}$. This offset is a safety measure, intended to prevent print head 10 from hitting the object to be coated O. The value of this offset is selected according to the accuracy of the movements of robot 20, the accuracy of the modelling of surface S in file F, and the geometry of print head 10.

From the trajectory files Traj generated at the various stages 104, a digital simulation makes it possible to know, during a stage 110, the position, orientation and possible activation of each nozzle 14 as a function of a configurable advance step of the standard nozzle 140, on each trajectory Traj.

Step 110 includes a first sub-step 1101 of determining the position and orientation of each nozzle 14 as a function of the parametrizable feed rate.

At sub-step 1101, calculator 40 segments each movement of the reference nozzle 140 into several elementary steps p, between two pairs ($P_{tcp}$, $\overrightarrow{OT}$) each formed by a remarkable point $P_{tcp}$ of trajectory Traj and the associated head orientation vector $\overrightarrow{OT}$. In other words, calculator 40 discretizes movement of print head 10, between remarkable points $P_{tcp}$ of a trajectory Traj, for the nozzles 14, by means of discretized positions $P14_{I,p}$.

Assuming that body 12 of print head 10 is rigid and correctly modelled, the position of reference nozzle 140 makes it possible to know the position of the other nozzles 14 when print head 10 moves along trajectory Traj.

It is considered that nozzles 14 are numbered from 1 to n×m, with index I. P14 is a point reached by a nozzle $14_I$ during movement of print head 10 along a trajectory Traj, with I between 1 and n×m.

In a sub-step 1102 of step 110, and at each point $P14_I$, calculator 40 searches for the corresponding nozzle $14_I$, for a point of impact PI of the spray of coating product exiting from this nozzle with the surface S, i.e., a point of intersection between a straight line arranged along the axis of the nozzle $14_I$ in question and the surface to be coated S. In other words, calculator 40 determines existence of an impact point $PI_{I,p}$ for each nozzle 14 and at each discretized position $P14_{I,p}$ at sub-step 1101. If the point of impact PI exists, calculator 40 considers that the nozzle should spray coating material at this point. If this point of impact PI does not exist, calculator 40 assumes that the nozzle should not spray coating material while at point $P14_I$.

It is considered that print head 10 is advancing at step p along the trajectory. In this case, during sub-step 1102 and for each nozzle $14_I$, calculator 40 may note the point reached $P14_{I,p}$ at step p, its orientation $\overrightarrow{OT}_{I,p+1}$ in this step and the coordinates of the corresponding impact point $PI_{I,p}$, the indices I and p meaning that the point reached and the impact point are those of nozzle I at step p. Calculator 40 then moves on to the next step, p+1, and repeats the same operations of calculating the impact point $PI_{I,p+1}$ for each nozzle $14_I$. If this point of impact exists, calculator 40 records it again as a pair formed by point $PI_{I,p+1}$ and associated vector $\overrightarrow{OT}_{I,p+1}$.

When there are two consecutive points of impact, $PI_{I,p}$ and $PI_{I,p+1}$, for nozzle $14_I$, calculator 40 calculates, at sub-step 1103 of step 110, a distance $d_{I,p}$ between these two points of impact. Distance $d_{I,p}$ is the distance to be covered by nozzle $14_I$ between the two steps p and p+1 of advance of nozzle I along trajectory Traj.

Similarly, if there are three consecutive impact points for the same nozzle $14_I$, calculator 40 calculates, at sub-step 1103, the distance $d_{I,p+1}$ to be coated in the second step, namely the distance between points $PI_{I,p+1}$ and $PI_{I,p+2}$, with the same grading as before.

Thus, during movement of print head 10 along the trajectory, it is possible to determine, for each nozzle $14_I$ and for a succession of steps, the distance $d_I$ to be coated over this sequence of steps, i.e., the distance this nozzle has to cover when painting, i.e., spraying coating material, and the distance of I, not to be covered on this succession of steps, i.e., the distance that this nozzle must cover without painting, i.e., without spraying such a product.

As the nozzles 14 are distributed and spaced from each other on the front side of print head 10, i.e., the side of print head 10 that faces the object O to be coated, not all nozzles travel the same distance between two steps of progression of print head 10. Thus, the surface to be coated S seen from each nozzle is different. To simplify the calculations, it is possible to calculate the distance to be coated and/or the distance not to be coated for reference nozzle 140 and to apply a multiplying coefficient of increase or decrease, taking into account the position of each nozzle $14_I$ with respect to reference nozzle 140 on the distances to be coated or not to be coated, this in order to correct the distances to be coated or not to be coated as a function of the distance of nozzle $14_I$ in relation to reference nozzle 140. This is also carried out at sub-step 1103.

Alternatively, the distance ratio can be applied immediately to the relevant distances without using a multiplier at sub-step 1103.

Whether or not a multiplier is used, at sub-step 1103 calculator 40 calculates a distance to be coated, $d_I$, or a distance not to be coated, $d'_I$, at each discretized position of the trajectory and, optionally, multiplier coefficients based on the distance between a nozzle $14_I$ and a reference nozzle 140.

The various calculations of the distances to be coated $d_I$ and of the distances not to be coated $d'_I$ and, if necessary, of the multiplying coefficients, for each nozzle $14_I$ make it possible to create, at a final sub-step 1104 of step 110, a programming file, i.e., a storage medium for a program, Prog(TRAJ), for activating the various nozzles $14_I$ on the overall trajectory TRAJ formed by the various trajectories Traj, in particular on each trajectory Traj defined opposite each section T of the surface to be coated S.

This programming file Prog(TRAJ) is used by ECU 30 to control each nozzle $14_I$ according to the distances to be coated, the distances not to be coated and the associated multiplying coefficients.

When the distance ratio is immediately applied to the distances concerned, without using a multiplier, as envisaged in the above alternative, the Prog(TRAJ) programming file only contains the distances to be covered and not covered, but no multiplier coefficient.

Alternatively, at each discretization step of sub-step 1101, it is possible to determine the potential impact point PI, as well as the distance $d_f$ or $d'_f$ and the multiplier coefficient, for each nozzle 14$_f$.

Thus, the order of sub-steps 1101-1103 mentioned above may be changed by adapting step 110.

In practice, the calculation steps are carried out by the computer methodor which constitutes calculator 40, this methodor being programmed for this purpose and associated with a computer memory in which the result of these calculations can be stored, before being transmitted, in the form of the programming file Prog(TRAJ) to ECU 30 and in the form of trajectory TRAJ to controller 24.

Under these conditions, when program Prog(TRAJ) has been defined at step 110 of the invention method, as mentioned above, it may be implemented at a step 112 when robot 20 moves print head 10 opposite the physical surface to be coated, of which file F is the computer model, along trajectory TRAJ, respecting the orientations of reference nozzle 140 at each remarkable point $P_{tcp}$, according to the activation program defined at step 110, which is represented by step 112 in FIG. 11.

Alternatively, program Prog(TRAJ) for activating nozzles 14 of print head 10 may be defined immediately after determination of the path opposite each strip T of the surface to be coated S. In other words, step 110 may occur prior to steps 106 and 108. It is then possible to group together the different nozzle activation programs defined for each trajectory opposite a strip T, into a global program for activating the nozzles over the entire trajectory, with regard to the entire surface S.

The invention is described above in the case where the markers R0 and R1 are orthogonal. In particular, these markers may be orthonormal or, conversely, non-orthogonal and/or non-normal. The calculations of the method of the invention are then adapted accordingly.

The above-mentioned operating mode and variants may be combined to generate new operating modes of the invention.

The invention claimed is:

1. A method for applying a coating product to a surface of an object, the surface being modelled by a computer file and comprising at least one zone to be coated, the method implemented by a print head which, on the one hand, is mounted on a robot arm moving the print head in relation to the surface and which, on the other hand, comprises a body equipped with at least one printing nozzle, the method carried out by a calculator and comprising:
   a) defining, via an automatic calculation from the computer file containing the model of the surface, a strip of surface to be coated, the strip being defined between two planes perpendicular to an ordinate axis of a first orthogonal coordinate system, the two planes respectively passing through an initial point and through a cut point, the initial point being a point of the surface whose ordinate in the first orthogonal coordinate system is the greatest among the points on the surface and the cut point being a point of the surface located, with respect to the initial point, at a distance measured in a negative direction along the ordinate axis, this distance being fixed by the geometry and nozzle distribution of the print head;
   b) defining, via an automatic calculation, a trajectory opposite the strip of surface, the trajectory comprising a succession of reference points to be reached by a determined point of the print head for spatial positioning of the print head with, at each reference point, an orientation of the print head to be respected;
   c) removing, via an automatic calculation, the strip to be coated from the computer file modelling the surface to be coated;
   d) repeating a) until the modelled surface to be coated is of zero area;
   e) defining a program for activating each nozzle of the print head on each trajectory; and
   f) applying the coating product by activating each nozzle of the print head on the different trajectories defined at b) while respecting the orientation of the print head at each reference point, according to the activation program.

2. The method according to claim 1, wherein b) comprises:
   b1) defining by iterations a portion of the strip of the surface;
   b2) calculating a point of impact on the portion defined at b1), and an axis of orientation at the point of impact;
   b3) removing, by computation, a portion of the strip of the surface;
   b4) restarting b1) until there is no more portion to be coated;
   b5) generating a part of the trajectory that corresponds to a forward movement of the print head by the length of the portion to be coated; and
   b6) based on the size of a beam of the coverage product coming from the print head and the size of the portion to be recoated, generating if necessary a part of the trajectory corresponding to an additional return or forward movement of the print head along the portion to be coated.

3. A method according to claim 1 wherein, when the surface includes at least one area not to be coated, the method further comprising, between b) and c):
   g) adapting the trajectory of the print head based on the zone not to be coated in order not to hit the object.

4. The method according to claim 1, wherein a) comprises:
   a1) defining a first orthogonal coordinate system having:
      as a point of origin, a point chosen by a user in an imaginary support surface located near the area to be coated in a representation of the space using the computer file or in the surface itself,
      as height-axis, a normal perpendicular to the support surface or the surface at the point of origin,
      as ordinate-axis, the vector product of the height-axis and an axis aligned on a direction of advance selected by the user, and
      as abscissa-axis, the vector product of the ordinate-axis and the height-axis;
   a2) defining a first normal and taking as its initial value a vector whose direction is the height-axis of the most recently defined first orthogonal coordinate system;
   a3) defining in the first orthogonal coordinate system a first point as a point on the surface whose ordinate is the largest within the first orthogonal coordinate system, among the points of the surface;
   a4) defining, within the first orthogonal coordinate system, a second point as a point on the surface to be coated located, with respect to the first point, at a first distance measured on the ordinate-axis and in repartition of each nozzle on the print head;

a5) calculating an average normal vector of a temporary strip of the surface defined between a first plane and a second plane perpendicular to the ordinate-axis of the first orthogonal coordinate system and passing through the first and second points, respectively;

a6) comparing the first normal vector and the average normal vector;

a7) if the first normal vector and the average normal vector are identified as being different at a6), then
   a71) redefining the first normal vector as being equal to the average normal vector;
   a72) redefining the first orthogonal coordinate system taking into account the new first normal vector; and
   a73) implementing a3) to a6) again; and a8) if the initial normal vector and the average normal vector are identified as being equal at a6), defining the portion to be coated as equal to the temporary strip at a5).

5. The method according to claim 4, wherein the body of the print head is equipped with several nozzles that are arranged in parallel rows, and the first distance is a multiple of a distance between two adjacent rows of nozzles or between two consecutive nozzles in the same row, measured perpendicular to the print head's forward movement direction.

6. The method according to claim 4, wherein b) comprises:

b1) defining a second orthogonal coordinate system whose point of origin is the first point, and whose abscissa-axis, ordinate-axis and height-axis, are superimposed with the axes of the most recently-defined first orthogonal coordinate system, at a1) or a72);

b2) defining a new abscissa-axis as the abscissa-axis of the second orthogonal coordinate system;

b3) defining, in the second orthogonal coordinate system, an initial point as a point on the strip of the surface to be coated, whose abscissa is the smallest among the points of the strip;

b4) defining, in the second orthogonal coordinate system, a cut point as a point on the strip of surface, situated, in relation to the initial point and along the new abscissa-axis, at a given distance;

b5) calculating an average normal vector for a temporary portion of the defined strip of surface to be coated, defined between a third plane and a fourth plane perpendicular to the new abscissa-axis, and passing through the initial point and the cut point, respectively;

b6) calculating a temporary longitudinal axis equal to the normalized vector product of the average normal vector calculated at b5) and of the opposite of the ordinate-axis of the second orthogonal coordination system;

b7) comparing the new abscissa-axis and the temporary longitudinal axis;

b8) if the new abscissa-axis and the temporary longitudinal axis are identified as being different at b7), then:
   b81) redefining the new abscissa-axis as being equal to the temporary longitudinal axis; and
   b82) implementing b3) to b7) again; and b9) if the new abscissa-axis and the temporary longitudinal axis are identified as being equal at b7), then defining a portion of the strip to be coated as equal to the temporary portion at b5).

7. The method according to claim 6, wherein b) comprises, following b9):

b10) calculating a print head orientation vector equal to the vector product of the new abscissa-axis and of the opposite of the ordinate-axis of the second orthogonal coordination system;

b11) defining a center point as a point located:
   midway between the orthogonal projections of the initial point and the cut point on a straight line passing through the initial point and having a direction vector equal to the new axis, and
   at a third distance from the initial point measured according to the ordinate-axis of the second orthogonal coordination system and in a negative direction along this axis, the third distance being half the first distance;

b12) defining a point of impact as the projection of the center point on the portion of the strip of surface along a straight line whose direction vector is the print head's orientation vector; and b13) if the point of impact exists, adding the point of impact and the print head orientation vector to the trajectory.

8. The method according to claim 7, wherein the body of the print head is equipped with several nozzles that are arranged in parallel rows, wherein the abscissa, along the new abscissa-axis of the second orthogonal coordinate system, of the center point is equal to half the total of the abscissa of the orthogonal projections of the initial point and the cut point on a straight line passing through the initial point and having a direction vector equal to the new axis, and wherein the center point is shifted in relation to this straight line and in the opposite direction to the ordinate-axis of the second orthogonal coordinate system, by a distance measured along the ordinate-axis and equal to half the product of the number of rows of nozzles and the distance between two of these rows.

9. The method according to claim 7, wherein if the point of impact at b12) does not exist, owing to the absence of material in the strip of the surface along a straight line whose direction vector is the print head orientation vector and that passes through the center point, then implementing, between b12) and b13):

b14) look for an extreme point of the portion of the strip whose position along an axis parallel to the print head orientation vector is the longest in the opposite direction to this vector;

b15) project the extreme point on an axis passing through the center point and parallel to the print head orientation vector, to define an alternative point of impact; and b16) assimilate the point of impact with the alternative point of impact for the portion of the strip in progress.

10. The method according to claim 7, wherein b) comprises, following b13):

b18) reducing the strip of the surface by a fraction of itself;

b19) determining if the strip of surface has a non-null area; and b20) if the result of b1) determination is affirmative, implementing b3) to b19) again.

11. The method according to claim 10, wherein the portion by which the strip is reduced at b18) is the portion defined at b9).

12. The method according to claim 7, wherein b) comprises, following b13):

b21) defining a print head axis vector at each point of impact as equal to the normalized vector product of the print head orientation vector at this point and of the ordinate-axis of the second orthogonal coordinate system;

b22) defining a reference point to be reached from the point of impact, the distribution of nozzles on the print head, the axis vector of the head and the ordinate-axis of the second orthogonal coordinate system; and b23) including the reference point and the print head orientation vector at the corresponding point of impact in the trajectory.

13. The method according to claim 12, wherein:

b) comprises adding to the defined trajectory, for each strip of the surface, at least one entry point and/or exit point, in addition to those calculated at b23); and/or b) comprises optimizing the number of reference points on the trajectory, during which at least one reference point is deleted, namely, a reference point that is collinear to a point that precedes it and a point that follows it along the length of the trajectory and whose axis of orientation is parallel to the axes of orientation of the points that precede and follow it along the length of the trajectory.

14. The method according to claim 12 wherein b) comprises determining, based on the size of a beam of coating product coming from the print head and the width of the strip of the surface, the number of return movements the print head must perform to cover the strip, and wherein, if necessary, one or more sections of the trajectory, following the first forward movement, are calculated by reversing the order of reference points defined at b22) for the previous section of the trajectory.

15. The method according to claim 4, wherein a71) to a73), or b81) and b82), are implemented until a certain number of iterations are done.

16. The method according to claim 1, wherein, based on the trajectory defined at b), the calculator calculates, for each print head nozzle a distance to cover or not cover from a series of points ahead of the print head.

17. The method according to claim 1, wherein e) comprises:

e1) discretizing the shifting of the print head, between the reference points of a trajectory, using discretized positions;

e2) determining the existence of a point of impact for each nozzle in each position discretized at e1);

e3) calculating a distance to cover or not cover in each discretized position of the trajectory and, possibly, multiplying factors, based on the distance between a nozzle and a reference nozzle; and e4) creating a programming sheet to activate each nozzle along the length of the trajectory.

* * * * *